United States Patent
Munemann

(10) Patent No.: US 9,529,910 B2
(45) Date of Patent: Dec. 27, 2016

(54) SYSTEMS AND METHODS FOR AN EXPERT-INFORMED INFORMATION ACQUISITION ENGINE UTILIZING AN ADAPTIVE TORRENT-BASED HETEROGENEOUS NETWORK SOLUTION

(71) Applicant: Jean Alexandera Munemann, London (GB)

(72) Inventor: Jean Alexandera Munemann, London (GB)

( * ) Notice: Subject to any disclaimer, the term of this patent is extended or adjusted under 35 U.S.C. 154(b) by 0 days.

(21) Appl. No.: 13/786,022

(22) Filed: Mar. 5, 2013

(65) Prior Publication Data

US 2013/0226865 A1 Aug. 29, 2013

Related U.S. Application Data

(63) Continuation-in-part of application No. 13/182,397, filed on Jul. 13, 2011, now abandoned.

(51) Int. Cl.
  *G06F 17/30* (2006.01)
  *G06F 3/0482* (2013.01)

(52) U.S. Cl.
  CPC ....... *G06F 17/30864* (2013.01); *G06F 3/0482* (2013.01); *G06F 17/30867* (2013.01)

(58) Field of Classification Search
  None
  See application file for complete search history.

(56) References Cited

U.S. PATENT DOCUMENTS

| | | | |
|---|---|---|---|
| 7,480,658 B2 | 1/2009 | Heinla et al. | |
| 8,285,121 B2* | 10/2012 | Kulas | 386/278 |
| 2008/0005113 A1 | 1/2008 | Li | |
| 2008/0005195 A1 | 1/2008 | Li | |
| 2008/0133706 A1* | 6/2008 | Chavez et al. | 709/218 |
| 2008/0183674 A1* | 7/2008 | Bush et al. | 707/3 |
| 2008/0189303 A1* | 8/2008 | Bush et al. | 707/100 |
| 2008/0189702 A1* | 8/2008 | Morgan et al. | 718/100 |
| 2009/0006322 A1* | 1/2009 | Chang et al. | 707/3 |
| 2011/0205960 A1 | 8/2011 | Wu | |
| 2011/0208722 A1* | 8/2011 | Hannuksela | G06F 17/3002 707/723 |
| 2011/0258203 A1* | 10/2011 | Wouhaybi et al. | 707/749 |
| 2011/0288937 A1* | 11/2011 | Manoogian et al. | 705/14.66 |
| 2012/0239677 A1* | 9/2012 | Neale | 707/759 |

* cited by examiner

*Primary Examiner* — Jay Morrison
(74) *Attorney, Agent, or Firm* — Philip H. Albert; Davis Wright Tremaine LLP

(57) ABSTRACT

A system for operating an expert-informed information acquisition engine utilizing an adaptive torrent-based heterogeneous network solution includes a memory storing computer-executable instructions; at least one processor configured to access the at least one memory and execute the computer-executable instructions to: receive user-defined tags associated with a first user; access interaction data associated with one or more second users and the first user; receive user-defined tags associated with one or more second users; identify a lexicon based on the user-defined tags; receive a query from the first user, wherein the query; rank one or more documents based on the lexicon; and display one or more documents based on the lexicon, with already-seen results removed.

17 Claims, 19 Drawing Sheets

SYSTEMS AND METHODS FOR AN EXPERT-INFORMED INFORMATION ACQUISITION ENGINE UTILIZING AN ADAPTIVE TORRENT-BASED HETEROGENEOUS NETWORK SOLUTION

CROSS-REFERENCE TO RELATED APPLICATIONS

This application is a continuation-in-part of U.S. application Ser. No. 13/182,397, filed Jul. 13, 2011, titled "Human Filtered Community Based Search and Discovery Engine," which is hereby incorporated by reference herein in its entirety.

FIELD

Embodiments of this disclosure relate generally to document mining and information acquisition and more specifically to expert-informed information acquisition engine utilizing an adaptive torrent-based heterogeneous network solution.

BACKGROUND

The Internet has enabled unprecedented access to information in a wide variety of subjects and topics. However, this vast access of information may be victim to information pollution. The information supply is subject to contamination. Therefore, when attempting to find information about a particular topic etc., a user has to sift through irrelevant, redundant, unsolicited and low-value information before finding accurate, relevant information.

SUMMARY

Other embodiments, systems, methods, computer-readable media, aspects, and features of the invention will become apparent to those skilled in the art from the following detailed description, the accompanying drawings, and the appended claims.

In one aspect, the present invention provides a system having memory storing computer-executable instructions; at least one processor configured to access the at least one memory and execute the computer-executable instructions to: receive user-defined tags associated with a first user; access interaction data associated with one or more second users and the first user; receive user-defined tags associated with one or more second users; identify a lexicon based on the user-defined tags; receive a query from the first user, wherein the query; rank one or more documents based on the lexicon; and display one or more documents based on the lexicon, with already-seen results removed. In an embodiment, the interaction data includes inquiries, page views, purchases, shares, replies, messages, recommendations, blog entries, modification of a wish list, or a combination thereof associated with the one or more lexicon terms. In an embodiment, the one or more user-defined tags comprising association of one or more keywords to a document. Identifying a lexicon may involve providing a negative filter removing one or more keywords and user-defined tags. Identifying the lexicon includes weighing the user-defined tags associated with the one or more second users based at least in part on a frequency of interaction between the one or more second users and the first user. The lexicon can also be based on receiving trust criteria from the first user. The user-defined tags associated with the one or more second users can be weighed based at least in part on the trust criteria from the first user.

In another aspect, the present invention provides a system having a memory storing computer-executable instructions, and a processor configured to access the at least one memory and execute the computer-executable instructions to: receive from an webpage server, a data stream, the data stream being a two-part torrent stream, wherein a first part of the two-part torrent stream is a torrent stream containing one or more first documents and content-provider tags associated with the one or more documents and a second part of the two-part torrent stream is a stream updating the first part of the two-part torrent stream; receive, from one or more users user-provided tags with the one or more documents; associate user-provided tags with the one or more first documents; and provide results to a user.

In yet another aspect, the present invention provides a computer-readable medium storing computer-executable instructions that, when executed by a processor, configure the processor to perform operations of: accessing interaction data comprising interactions between one or more users and one or more documents; determining a relationship between the one or more users and a target user; determining lexicon data based at least in part on the interaction data and the relationship with the target user; and returning results to a user. Lexicon data is filtered to select lexicon data having a relationship counter greater than a pre-determined threshold provide to a user device associated with the target user one or more document based at least in part on the filtered lexicon data responsive to a search query.

In still another aspect, the present invention provides a method including receiving a data stream, the data stream being a two-part torrent stream, wherein a first part of the two-part torrent stream is a torrent stream containing a first selection associated with a first result of a first query a second part is a torrent stream containing updates to data contained in the first stream; identifying relevancy indicia associated with the selection; determining one or more refines associated with the relevancy indicia; and transmitting a second result of a second query, based at least in part on the first query and the one or more refines. In an embodiment, the relevancy indicia include an input identifying a preference associated with a user. It can indicate a similarity or a negative identifier, and can be based at least in part on receiving a second selection from a user.

In still another aspect, the present invention provides an interface for tagging files, comprising an adaptive, torrent-based program interface configured to share user-authorized data, prioritize an information overlay upon an executing program, while communicating authorized data via a continuously updating torrent stream, wherein the interface is configure to wherein functionality for the interface is presented on screen in a graphical image of multiple icons grouped in a contiguous relationship, each icon representing a function related to interacting with a website, wherein icons in the plurality are grouped around a centrally-positioned search icon to form a first circumferential plurality of icons, and remaining icons in the plurality are grouped around the first circumferential plurality of icons to form an outer, second circumferential plurality of icons. The interface can be two-dimensional, or it can be three-dimensional, having icons that are displayed when image is manipulated by a user to rotate in a three dimensional appearance on a display.

Many other features and advantages of the present invention will be realized upon reading the following detailed description, when considered in conjunction with the drawings.

BRIEF DESCRIPTION OF THE DRAWINGS

Reference will now be made to the accompanying drawings, which are not necessarily drawn to scale, and wherein.

DETAILED DESCRIPTION

Figure 1:
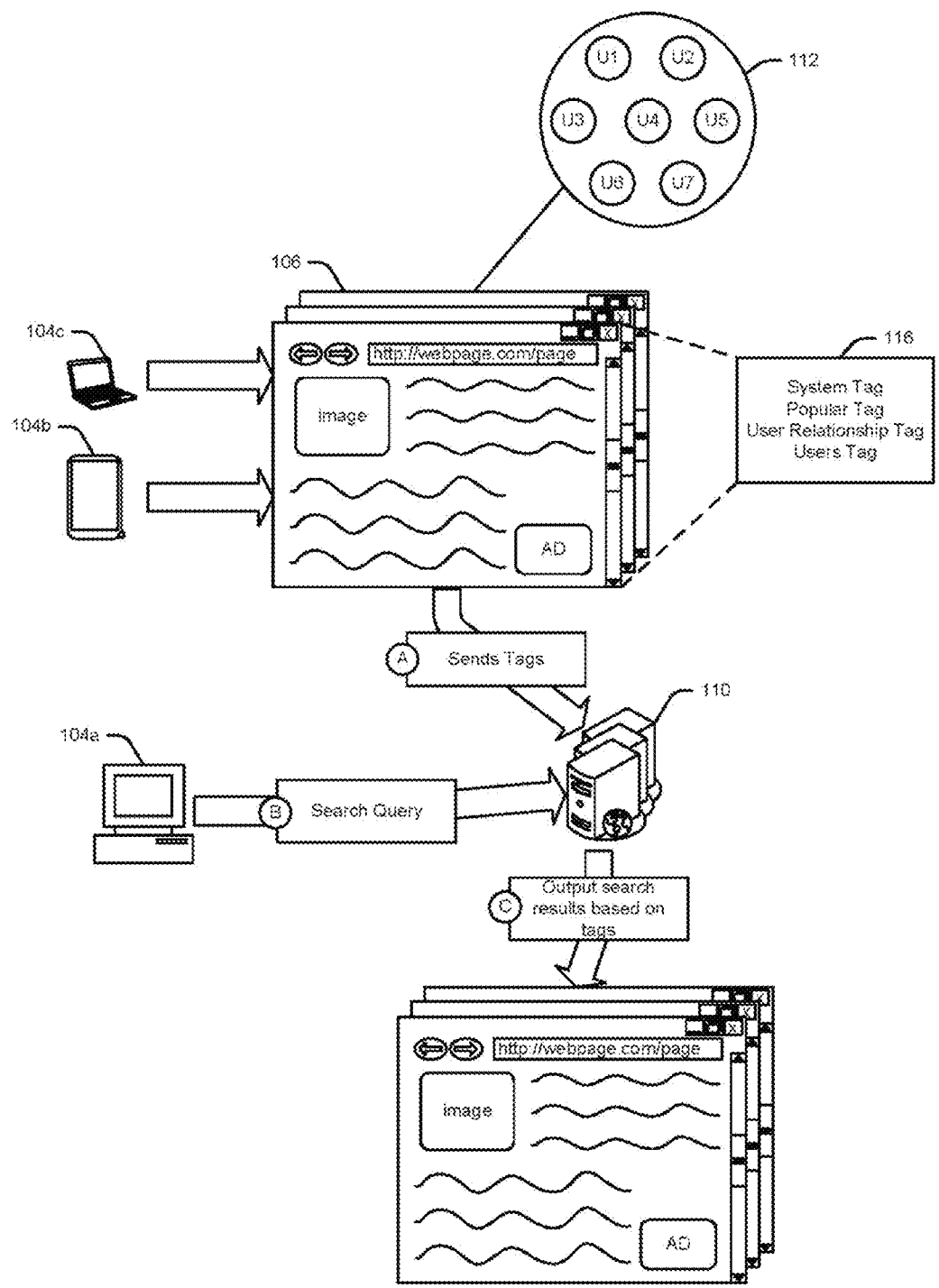
FIG. 1 is a data flow diagram of the example system search engine utilizing the user based context-aware document data.

Illustrative embodiments of the disclosure will now be described more fully hereinafter with reference to the accompanying drawings, in which some, but not all embodiments of the disclosure are shown. The disclosure may be embodied in many different forms and should not be construed as limited to the embodiments set forth herein; rather, these embodiments are provided so that this disclosure will satisfy applicable legal requirements. Like numbers refer to like elements throughout.

Embodiments of the disclosure now will be described more fully hereinafter with reference to the accompanying drawings, in which embodiments of the invention are shown. The invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Traditional web-searches rely heavily on automated algorithms for document mining and web-searching. They may utilize heuristics related to keywords or strings inside web-based documents to identify documents related to search terms. Some examples of these heuristics may be utilizing a word frequency match between a search term and terms present in the document. For example, if a user queries a web-search engine with the term "Matrix," the documents may be identified based on the occurrence of the term "Matrix" within the webpage documents.

These heuristic searches may not be able to differentiate semantic contexts of various terms or perform semantic analysis regarding the meaning of specific terms. Therefore, referring back to the previous example, the user may be querying for vastly different types of documents. If the user is a mathematician, the word "Matrix" may be in reference to a rectangular array of numbers. If the user is a fan of science fiction, the word "Matrix" may reference a popular 1999 movie starring Keanu Reeves. A web search engine utilizing only heuristics and statistical algorithms may return irrelevant searches to many users.

These systems may not account for additional context or human knowledge to personalize or customize the web search based on the needs of a user. For example, the best webpage for learning about mathematical matrix operations may not rank highly on the search results of a traditional search-based engine. The webpage might not contain the appropriate meta tags or data for a traditional search engine to identify. Further, in the set of all-internet users, people may have various expertise and specialty for which they are better able to provide semantic understanding or context-based understanding.

These people may have unique knowledge about specific websites and documents. Therefore the knowledge encompassed by these experts may provide for more relevant web search results that are customized for the preferences of a user. The experts may encompass a broad range of patterns, preferences and skills that may be utilized and leveraged for a more satisfactory experience.

Embodiments of this disclosure provide for human-knowledge based tagging or identification of web documents. This knowledge may be utilized and restricted based on community membership, contextual usage, social media connectivity, ratings, emotions and other such contextual information.

In one example, an opera singer "Placido," who comes from Spain may be invited for an opera performance at the "Detroit Opera House." Although, the area near Detroit Opera House is deemed emotionally "safe" by human-based experts of the city of Detroit, areas surrounding the opera house can be rated anywhere from "shady" to "very dangerous" by these local experts. If Placido wanted to try the local cuisine at a restaurant and uses a traditional search engines and inputs the terms "Michigan Cuisine" and "Detroit," a top search result may include "8 Mile Grill" and directions for the 8 Mile Grill through a road known as the 8 Mile Road. However, there are certain parts of the 8 Mile Road that may be deemed dangerous, and an alternate route may be "safer" for Placido. Traditional search engines would not be able to utilize emotion-based understanding and therefore would be unequipped to answer Placido's query.

However, if the search engine could tap into a local expert's knowledge, the local expert "Marshall" who is very familiar with Detroit and incredibly familiar with "8 Mile Road," may be able to input his knowledge of various sections of 8 Mile Road with emotional ratings such as "Safe" and "unsafe." Placido would be able to determine if the restaurant "8 Mile Grill" is in a safe neighborhood.

The invention includes methods for creating user-informed-customized tags and functionality to retrieve the tags from an online social networking environment that supports tags of the type described herein.

Tags can be created by the user via the provider's user interface by defining various tag parameters, e.g. name, graphic icon, etc. This invention discloses a system and method for creating customized tags that represents personal characteristics and preferences, by users of a social network website, to facilitate online social networking, as well as advertisement method in the online social networking environment by using sponsored tags.

Tags can be embeddable in that they could be inserted in a website GUI for display by a user. Also, tags may have embedded contents, e.g. a photo, a song, a location of a profile page, a shout out, an expression of feelings, tags, or presents. The present invention utilizes a backwards search, with each previously viewed page having a tag overlaying it.

FIG. 1 is a data flow diagram of an example system for expert-informed information acquisition. In the example system, a website 106 may be visited and viewed by individual user and their individual user devices 104. Further, the website may be related to a topic have particular content. Therefore, the content of the website 106 may be identified through the use of identifier tags. In the example system, the website 106 may have an automated tagging or a system tag based on the words or other tokens utilized in the website. For example, if a website has text for the words "fast ferry," one can associate that with search query relating to a "ship," for example. However, these automated system tags may not be able to provide semantic understanding of a particular document. Further, users may browse a particular website and for that particular website 106 and may provide user-specific tagging. If many users from many different areas and expertise provide similar or same tags, then the websites 106 may have popular tags associated with many users. Further, users may have specific context or specific-user group related terminology. For example, a group of marine engineers may be interested in different information than a group of tourists who visit a cruise. However, similar terminology maybe used on both websites. Therefore, while browsing, a group of marine engineers may add additional context such as "engineering" or "ship design" as tags. However, these tags would not be equally applicable to all. Therefore, the user relationship tag may be restricted via user group. Finally, a user may provide his individual tag for specific information.

Further, the user specific tags may contain other information such as emotion, profession, expertise, education, location, material, history, ratings, clubs, communities, persons, animals, slang, language, and cultural notations, to name a wide range of examples.

In operation A, with all of these tags, a user device, an application downloaded on the user device, a web-browser add-on may send all these contextual tags to the search engine server 110. The service provider system 110 may identify compare the query with a hierarchy of user-defined tags. This hierarchy may be based on user preferences and may be prioritized based on privacy and group settings.

In operation B, a user device 104 may enter a search query. During the search query, the user may enter keywords, restrictions on relationship tags. For example, if a user wants to utilize relationship tags by people who are directly connected to him on a social network, or communicatively connected to him directly the user would be able to enter such a restriction that only tags from people who have one degree of separation would be utilized. Further, the user may have negative refiners such as hiding search results that have already been seen by the user, excluding websites with certain tags or just seeing past searches with additional, further refiners. For example, if a marine engineer did not want to view websites about "cruise lines," the marine engineer may input a negative refiner such as "vacation" and this would remove all websites having an associated tag of "vacation."

In operation C, based on the hierarchy and user-specific tags, the service provider system 110 may output a search results based on the tags.

Figure 2:
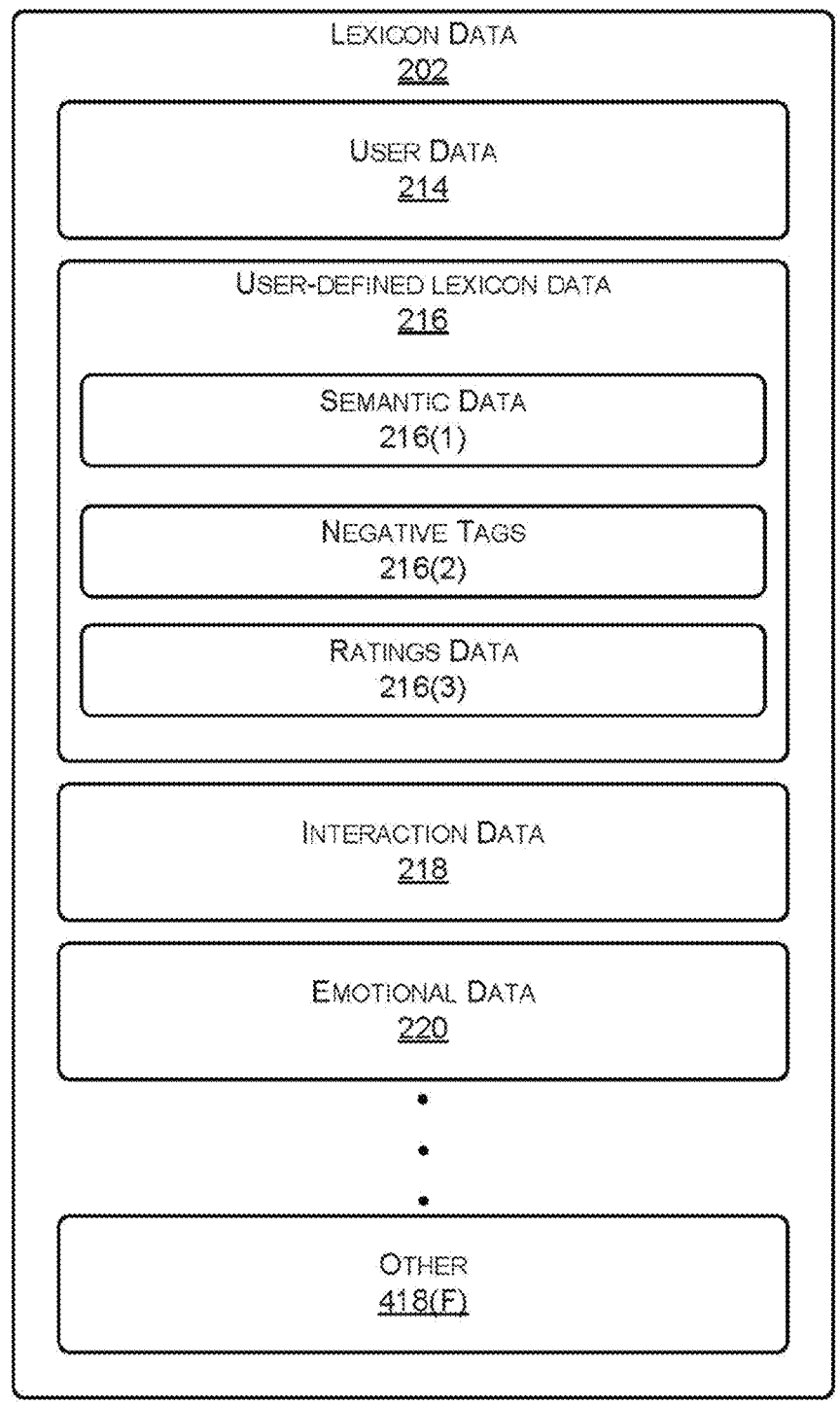
FIG. 2 is a schematic block diagram of an example architecture for a search engine system with a distributed database.
Figure 3:
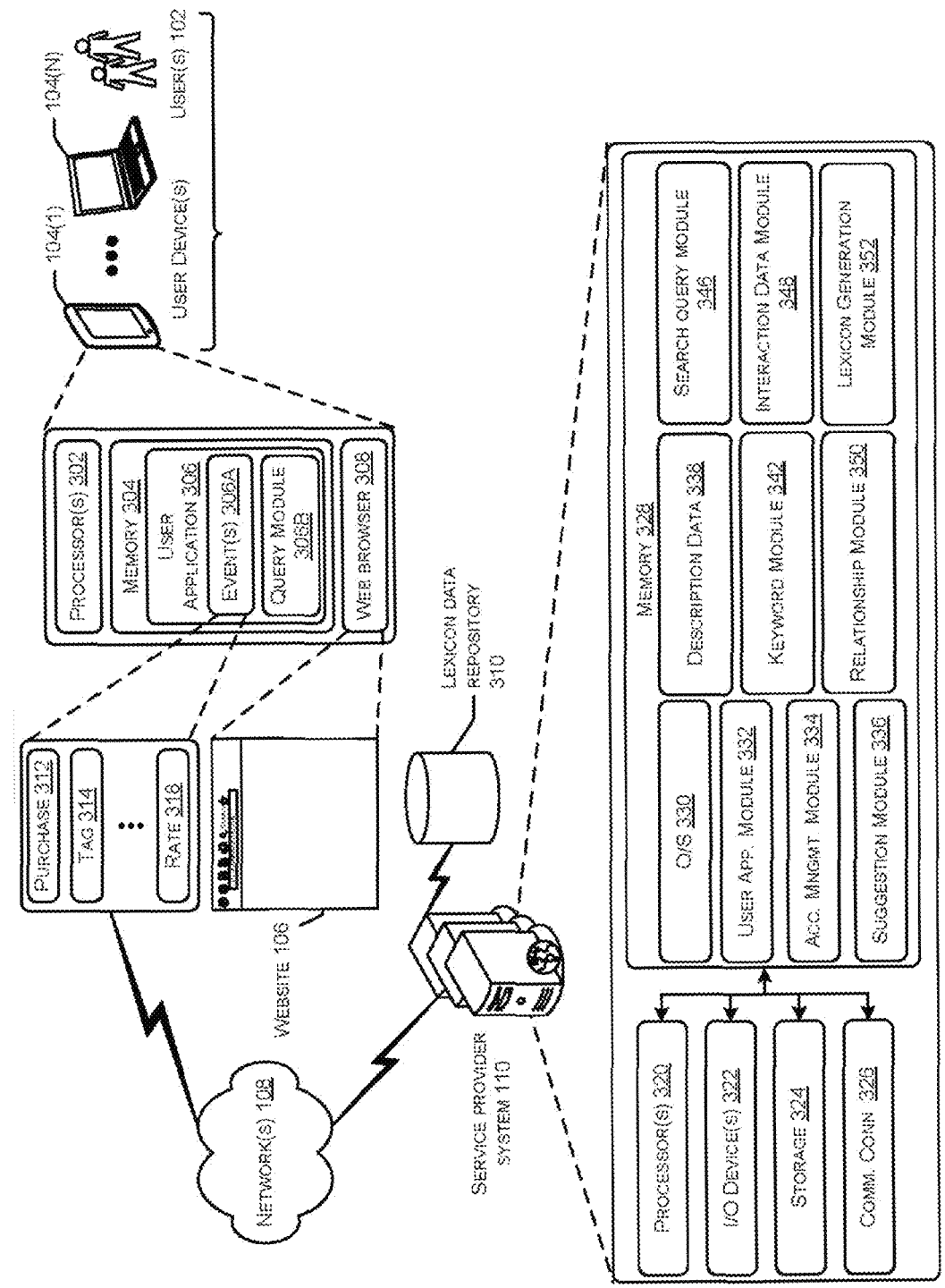
FIG. 3 is a representative method flowchart featuring the steps of creating user defined tags.

FIG. 2 illustrates a hierarchy of data types frequently referred to during the discussion of FIG. 3.

FIG. 3 depicts an illustrative system or architecture 300 in which techniques for providing suggestions based at least in part upon keyword analysis may be implemented. In architecture 300, one or more users 102 (e.g., account holders, guest users, etc.) may utilize user computing devices 104 (1)-(N) (collectively, user devices 104) may interact and receive data from one or more search engine servers 110. In some examples, the networks 108 may include any one or a combination of multiple different types of networks, such as cable networks, the Internet, wireless networks, cellular networks, and other private and/or public networks.

Turning to the contents of the user device 104 may be configured with one or more processors 302 configured to execute machine-readable instructions. The processor 302 may include a central processing unit (CPU), a digital signal processing unit (DSP), a reduced-instruction set computer-processor (RISC), a complex-instruction set computer processor (CISC), a microprocessor, a microcontroller, a field-programmable gate-array (FPGA) or any such combination thereof. The processor 302 may be configured to execute program instructions or machine instructions that may be stored in a memory 304.

The memory 304 may be any computer-readable medium, coupled to the one or more processors 302, such as random access memory ("RAM"), read-only memory ("ROM"), and/or removable storage devices. The memory 2xx may store one or more program modules or program applications such as the user-application 306 and a web-browser 308. The memory 308 may store data files such as those related to a user's lexicon. The machine-readable storage medium may include, but is not limited to, hard drives, floppy diskettes, optical disks, CD-ROMs, DVDs, read-only memories ("ROMs"), random access memories ("RAMs"), EPROMs, EEPROMs, flash memory, magnetic or optical cards, solid-state memory devices, or other types of media/machine-readable medium suitable for storing electronic instructions.

Turning to the contents of the memory 304, the memory may be store a user-application 306 to facilitate the interaction with the service provider system 110. In some embodiments, the user application 306 may be a proprietary application known as the "Tool rose 1700." The user application 306 may be a platform specific application such as that specifically designed for a mobile phone or a tablet computer platform. Further, the user application 306 may be an add-on or a modification of a web-browser application 308. Through the web-browser, the user may view or interact with one or more websites documents 106. The user application 306 may allow the user to provide context related to the website 106 to the service provider system 110. Further, the user application 306 may identify related websites through browsing patterns, clicking patterns. Further, the user application 306 may provide validation of another user's tags and lexicon.

For example, in some examples a user may just browse the website 106 for information acquisition. In other examples of websites that may provide user interaction data through the user application 306 may include any website that supports user interaction. The websites don't have to support user interaction, as the interface embodied in the tool rose 1700 of FIG. 15 can tag on any website. These may include social networking sites, online retailers, informational sites, blog sites, search engine sites, news and entertainment sites, and so forth. Therefore, the user-related context data or context tags may include word tags, emotional identifiers, subject matter tags, location identifiers, negative identifier tags etc.

In addition to monitoring user provided tags, the user application 306 may provide interaction data and find related or associated users. In some examples, the website 106 may host a social networking platform for interacting with other users and/or sharing items. Based on these communication patterns or social networking connections, the user application 306 may determine related users in various contexts. For example, a user could be a social networking identifier connection. In other examples a related users could be related through similar browsing patterns, similar tagging patterns, or similar negative identifiers. With user application 306, users can be related to each other as affiliated communities, professions, or language, or just independently sharing their identifier with friends and forming their own network, or business colleges or companies forming unique and independent networks. Part of the social motivations for prompting users to tag the information, is a social currency earned by tagging information for public consumption. The more open the tags, and the more the other users agree with the tags, the more social currency earned, the social currency can be exchanged for a variety of things at a later date.

The service provider 110 may receive data indicative of the interaction between the website 106 and the user through the user application 306 to identify related users and also provide a shared lexicon among the related users. The service provider 110 is part of the "open" swarm (a node) and is primarily to act as backup and a place to download the tool rose 1700 user application 306 by activating a torrent, apart from website 106; the lexicon ostensibly could be on every user device.

Further turning to the user application 306, in some examples, a user 102 may log in or otherwise enter a session. The log-in may be based on receipt of log-in credentials such as a user identifier ("ID") and/or a password. However, in some examples, the service provider may utilize cookies or some other state-verifying technique to determine that a user 102 is still logged in or was last logged in from the same computing device such as, but not limited to, user device 104. Alternatively, or in addition, a user 102 may maintain a session over multiple log-ins, using multiple different user devices 104, and/or over a period of time that may be longer than a typical web browser session.

In some aspects, the events monitors 306A may be configured to keep track of actions, events, and/or occurrences associated with one or more session IDs, user IDs, web sessions, log-in sessions, and/or user accounts. As such, in some examples, the actions, events, and/or occurrences of a user 102 (or multiple users) may be transmitted to the service provider system 110. Examples of such events may include purchases 312, keyword tags 314, user ratings 318 and validations etc. The service provider 110 may utilize these events to identify additional related content and make suggestions or recommendations to the user. The events monitor 306A may contain a user interaction module to enable a user to set security settings. User-identified security for release of tagging information and/or files, to include user-specified by social network, base community or allied by identity or security protocols, user-defined social network such as personally elected, family ties, friendships or professional groups, and by degree of social separation of individuals or groups. Anyone can search open tags, they don't need to be logged in. If security means privacy, a user can remain anonymous to the system by requesting an anonymous login. Rather than use degree of separation as a search tool, the user can tag and communicate with other users if they have their ID (anonymous or standard).

Further turning to the contents of the memory 304, the query module 306B may be utilized for a user-query utilizing the user application 306. In one example, the user may utilize data files such as a user-specific lexicon and context related to certain websites. The user may input a list of search parameters or query parameters that may include keywords. Further, during the search query, the user application 306 may transmit either the user-specific lexicon or a unique identifier associated with the user-specific lexicon to the service provider system 110.

In one non-limiting example, a user 102 may access a website 106 in conjunction with a user application 306 on one of the user devices 104. While accessing this website 106, the user may enter a query involving keywords to a service provider system 110. The user 102 may be presented with a graphical user interface ("GUI") that may be configured to display one or more query results. Further, the user may receive one or more recommendations related to other search terms, or other related websites that may not be directly provided by the query.

In another non-limiting example, a user 102 may input an image into the query module 306B. The service provider system 110 may receive the image, identify context related to the image and output other images or other data in relation to the image.

Now, turning to the contents of the service provider system 110. The service provider system 110 may include any type of computing devices such as, but not limited to, mobile, desktop, thin-client, server, smart TVs, cloud computing devices and the like. In operation, service provider system 110 may be configured to execute computer-executable instructions in order to form a special-purpose computer or particular machine that facilitates context-based information acquisition. Operations for providing context may be relationship analysis, graphing, keyword analysis, and/or suggestion services. In some examples, the service provider computers 110 may be in communication with one or more users devices, other service provider systems, social networking systems etc., via the networks 108, or via other network connections. In certain embodiments, the service provider system 110 may include one or more servers, perhaps arranged in a cluster, as a server farm, or as individual servers not associated with one another. These servers may be configured to host, receive, store, and/or process information acquisition, file sharing, lexicon sharing, information crawling, relational tagging and other such services based on requests from the one or more service provider computers 110. Additionally, in some aspects, various services may be separate and distinct from one another and may also be provided through the user of one or more user devices 104 in relation to the user application 306. For example, if a user belongs to a particular user group that may have a shared lexicon in relation to certain websites, this shared lexicon may be stored in any of those user devices.

In one illustrative configuration, the service provider system 110 may include at least one memory 328 and one or more processing units (or processor(s)) 320. In some examples, the processor(s) 320 may be implemented as appropriate in hardware, software, firmware, or combinations thereof. Various implementations of the processor 320 may include computer-executable or machine-executable instructions written in any suitable programming language to perform the various functions described. The processor 320 may include a central processing unit (CPU), a digital signal processing unit (DSP), a reduced-instruction set computer-processor (RISC), a complex-instruction set computer processor (CISC), a microprocessor, a microcontroller, a field-programmable gate-array (FPGA) or any such combination thereof. The processor 320 may be configured to execute program instructions or machine instructions that may be stored in a memory 328.

The memory 328 may store program instructions that are loadable and executable on the processor(s) 320 as well as data generated during the execution of these programs. Depending on the configuration the memory 328 may be volatile (such as random access memory ("RAM")) and/or non-volatile (such as read-only memory ("ROM"), flash memory, etc.). The service provider system 110 may also include additional storage 324, which may include removable storage and/or non-removable storage. The additional storage 324 may include, but is not limited to, magnetic storage, optical disks, and/or tape storage. The disk drives and their associated computer-readable media may provide non-volatile storage of computer-readable instructions, data structures, program modules, and other data for the computing devices. In some implementations, the memory 122 may include multiple different types of memory, such as static random access memory ("SRAM"), dynamic random access memory ("DRAM"), or ROM.

Further, the service provider system 110 may contain one or more databases known as the lexicon repository database 310. This may contain various tags, web-crawled websites, file-sharing, images, videos among other things. Further, the lexicon repository 310 may be remotely hosted or stored locally. It is to be understood that the lexicon is group knowledge, every group can have their own version, and everyone can seed open tags.

The memory 328 and the additional storage 324, both removable and non-removable, are all examples of computer-readable storage media. For example, computer-readable storage media may include volatile and non-volatile, removable and non-removable media implemented in any method or technology for storage of information such as computer-readable instructions, data structures, program modules, or other data. The memory 328 and the additional storage 324 are all examples of computer storage media.

The service provider system 110 may also contain communications connection(s) 328 to communicate with stored databases, other computing devices or servers, user terminals, and/or other devices on the networks 108. The service provider system 110 may also include input/output ("I/O") device(s) 322, such as a keyboard, a mouse, a pen, a voice input device, a touch input device, a display, speakers, a printer, etc.

Turning to the contents of the memory 328 in more detail, the memory 328 may include a wide variety of description data 338 and/or other stored data (e.g., data files, profile information, etc.), an operating system ("OS") 133, and one or more application programs or services for implementing the features disclosed herein.

The description data 338 may include a wide variety of data associated with any number of data tag information, emotional identifiers, descriptors, restrictions, negative restrictions etc. item review information, item rating information, user profile information, etc. In addition to storing description data 338, in certain embodiments, historical information associated with events, actions, and/or other user interactions with various items may be stored. Indeed, a wide variety of information associated with items may be stored in the memory 328. The OS 330 may include one or more suitable applications and/or program modules that facilitate the general operation of the service provider computer 110, as well as the execution of one or more of the additional application programs.

The memory 328 may also include a keyword module 342, which may include any number of suitable applications and/or modules configured to perform keyword analysis on data and website documents. In operation, the keyword module 342 may identify an item or a group of related topics for purposes of performing a keyword analysis. A wide variety of suitable techniques may be utilized to identify a group of related websites or documents. As one example, one or more websites 106 associated with user events (e.g., selections, clicks, views, ratings, purchases, reviews, etc.) may be identified during a session or across multiple sessions. In certain embodiments, the websites may be identified based upon the utilization of a filtering technique. As another example of identifying a group of related websites, a graph or a subset of a generated graph (e.g., a content-based graph, a collaborative filtering graph, a hybrid graph, etc.) may be identified. In certain embodiments, multiple groups or clusters of related websites may be identified from a generated graph. As yet another example of identifying a relevant websites, a new website to be added to an existing tag or lexicon.

Further, the above mentioned techniques utilized by the keyword module 342 may also be utilized to identify similar users or user relationships. The keyword module 342 may identify a group or related users, based on associated user events and associated user-provided tags.

Once one or more groups of related websites have been identified, respective description data 132 or lexicon data associated with each of the websites may be accessed from memory 328 or obtained from any number of data sources or other components of the architecture 100. Any number of suitable information extraction techniques and/or evaluation techniques, such as latent semantic analysis ("LSA"), heuristic information extraction algorithms (e.g., a term frequency-inverse document frequency ("TF-IDF") analysis, etc.) and/or data-driven information extraction algorithms, may then be utilized to evaluate the description information 338 or the related tag data. In certain embodiments, one or more terms and/or phrases included in the description data 132 for a website or in relation to a user group may be weighted for purposes of determining keywords for the item. Additionally, one or more identifiers may be located and utilized to identify certain words and/or phrases to be weighted. For example, when evaluating a movie, terms and/or phrases that specify a genre for the movie may be weighted. Similarly, when evaluating an apparel item, terms and/or phrases that specify, define, or describe a style for the item may be weighted. Additionally, in certain embodiments, certain terms that commonly appear in the description data 132, such as "a," "the," and/or other relatively common terms, may be filtered from the keyword identification analysis.

Additionally, one or more respective lists of common keywords that are representative of each of the groups of related items may be determined. Any number of suitable evaluation techniques, such as a TF-IDF analysis and/or other suitable information extraction and/or evaluation techniques (e.g., heuristic information extraction algorithms, data-driven information extraction algorithms, etc.), may be utilized to determine a list of common keywords for a group. In certain embodiments, shared keywords between the various websites included in a group may be identified. For example, a list of keywords for each website in a group may be compared in order to determine a list of common keywords for the group. In other embodiments, description data 338 for multiple websites may be evaluated utilizing a TF-IDF analysis (or other suitable analysis) in order to identify keywords that are shared across the various users of the group. As desired, certain terms in the description data 338 for the items may be weighted during the analysis. Additionally, in certain embodiments, commonly appearing terms may be filtered from the analysis.

An example TF-IDF analysis may determine a number of times that various terms appear in description data 338 for a website identified by a particular user-group. A term frequency may be determined from the number of times that a term appears compared to a total number of terms in a document. For example, if a particular term appear three times in a 100 word document, then the term frequency may be calculated as (3/100) or 0.03. Additionally, the TF-IDF analysis may determine a number of documents (e.g., description documents for various items) in which various terms appear. An inverse document frequency may be calculated from the number of documents in which a term appears. For example, if a term appears in 10 out of 250 documents, then the inverse document frequency may be determined as the log (250/10) or approximately 1.4. A TF-IDF score for a term may then be determined based upon the term frequency and the inverse document frequency. Utilizing the example above, a TF-IDF score for a term may be calculated as the product of the term frequency and the inverse document frequency. In other words, a TF-IDF score of 0.042 may be determined for a term. In certain embodiments, TF-IDF scores may be evaluated in order to determine or identify common keywords or terms that are representative of a group of items.

These keywords that may be analyzed may be either "system tags" or "user-group tags." These may be weighted accordingly based on the context of the search or information acquisition.

Once a list of common keywords has been determined or identified for a group of related websites, or users, the list of common keywords or also known as a lexicon may be utilized to generate or make a wide variety of different types of suggestions, such as clustering suggestions, suggestions for topics associated with the websites, items, and/or recommendations of similar websites.

With continued reference to FIG. 3, the memory 328 may also include a suggestion module 336. In some aspects, the suggestion module 336 may be configured to provide suggestions and/or recommendations for users (e.g., a suggestion of a number of topics to use for a clustering analysis, etc.) and/or to a user 102 based on actions or events (e.g., based on viewing, rating, purchasing, etc.) associated with their internet browsing and communication patterns. In certain embodiments, the suggestion module 336 may be configured to generate suggestion based at least in part upon identified keywords tags or a similar lexicon. As desired, the suggestion module 336 may also utilize a purchase history or other historical information during the generation of suggestion. For example, the suggestion module 336 may be configured to provide a suggestion (i.e., a list of similar items, a topic that the user 102 may be interested in, etc.) to a user 102 in response to an action or event. In other examples, the suggestion may be a general suggestion based on habits, likes, or past purchases, or other historical and/or aggregated information regarding the user 102.

A wide variety of different types of suggestion may be generated as desired by the suggestion module 336. In certain embodiments, the suggestion module 336 may evaluate respective lists of common keywords associated with various groups of items in order to determine a number of topics to be utilized for a clustering technique, such as a latent Dirichlet allocation (LDA) analysis, a canopy clustering technique, a hierarchical clustering technique (agglomerative, divisive, etc.), a centroid-based clustering technique (e.g., k-means clustering, etc.), a distribution-based clustering technique (e.g., Gaussian distribution, etc.), a density-based clustering technique (e.g., density-based spatial clustering of applications with noise ("DBSCAN"), ordering points to identify the clustering structure ("OPTICS"), etc.), a deterministic annealing clustering technique, etc. For example, a graph (e.g., a collaborative filtering graph, etc.) may be evaluated in order to determine various subsets or clusters included in the graph. Respective common lexicon may then be determined for each of the subsets or user groups. A total number of identified common keywords may then be calculated across all of the subsets or all users based on overall usage or tagging patterns. The total number of keywords may then be utilized to determine a number of topics, groups, or centers to be evaluated during the performance of LDA or other suitable clustering technique. For example, a number of LDA topics for evaluating and forming clusters associated with an electronic catalog may be determined.

For example, if a user were browsing an electronic shopping site, as an example of generating a suggestion, an evaluation of keywords may be utilized to make suggestion and/or recommendations associated with new items, such as new items to be added to an electronic catalog. For example, a description for a new item may be evaluated in order to determine keywords associated with the new item. The keywords for the new item may then be compared to respective lists of keywords associated with various groups of items (e.g., subsets of a graph, etc.) included in the electronic catalog. Based upon determined correspondences and/or similarities between the keywords for the new item and the keywords associated with other items, one or more topics and/or categories that best fit the new item may be determined. Suggestions and/or recommendations may then be made based at least in part upon the determined topics and/or categories. In this regard, suggestions and/or recommendations may be made for new items without waiting to collect historical information (e.g., viewing information, rating information, purchase information, etc.) associated with the new items. Other types of suggestion may be generated by the suggestion module 138 as desired. The described suggestion is provided by way of example only.

Further turning to the contents of the memory, an interaction data acquisition module 348 may be configured to receive various events from the event module 306A from the user device 104 is configured to acquire the interaction data 218. The interaction data acquisition module 248 may be a stand-alone module or have functionality incorporated into other modules. The interaction data acquisition module 348 may retrieve interaction data 218 from other modules, devices, and so forth, or may generate interaction data. Interaction data 218 may include communication interactions between users 104, social networking interactions, similar interests and group memberships. The interaction module 348 may analyze the interaction data and provide a context for the lexicon and the propagation of the lexicon to the users.

A relationship module 350 is configured to access interaction information 218. The relationship module 350 may determine relationship data associated with users 104. As used herein, "related" and "relationship" indicate an affiliation between two or more parties. This affiliation may be legal (such as married spouses), filial (such as siblings), organizational (such as being members of the same club), professional, friendly, and so forth. Relationships may be defined by frequency of contact, context of contact, duration of contact, or more. Relationships may be thus connections between users 104 which are of some particular significance to the participants. For example, a user 104 may attribute much greater significance to a recommendation from a friend of many years than from a stranger on the street. Relationships may also be dynamic and change over time.

The relationship module 350 may determine relationships through explicit inputs, such as entries within a social network, manual entry by the user, and so forth. For example, a user 104 may enter user data about other members of the household and indicate the relationship such as spouse, child, parent, roommate, and so forth. In some implementations, this data may be derived or included as part of the user data that the user 104 may provide during interaction with a merchant, another users or utilization of the user application 306. For example, the user 104 may set up an account with an online merchant and indicate that spouse user 104 has equal rights to make account changes, to make purchases, and so forth while child users 104 and 104 may only add items to a suggested shopping or wish list. Using this information, the relationships between these users as members of a family may be determined.

The relationship module 350 may also build relationship data using interaction data 218. An interaction between two or more users may be used to establish a relationship. For example, user 104 may share information about a particular product, topic or webpage document with user 104. This act of sharing may establish a relationship. The relationship may be strengthened by the first user 104 replying back to the second user 104.

A lexicon generation module 352 is stored in the memory 328 and is configured to identify and associate user-defined lexicon. The lexicon generation module 352 is configured to access interaction data 218 comprising interactions between one or more users 104 and one or more webpages or documents. For example, data about interactions associated with a particular topic or subject may be accessed. The lexicon generation module 352 determines a relationship between the one or more users and a target user 104. For example, the target user 104(1) is friends with users 104(2), 104(3), and 104(4). Lexicon data is determined based at least in part on the interaction data 218 and the determined relationship(s) with the target user. Continuing the example, interactions such as users 104(2), 104(3), and 104(4) posting comments on a particular item.

Further turning to the contents of the memory, based on receiving and identifying the keywords, the service provider system 110 may be configured to storing a wide various of information may store a variety of information such as that described below. The repository 310 may store user data 214 about the users 104 including one or more of user identifications, lexicon preferences, privacy settings, social network data, and so forth. This user data 214 may include relationship data, such as connections within a social network, user affiliations, user-group preferences, location information and so forth.

The user-defined lexicon data 216 may be stored. This may include semantic data 216(1), negative filter data 216(2), ratings data 216(3), or a combination thereof. The semantic data 216(1) may include a special designation, definitions, identification, mark, term, symbol, text, sound, image or other multimedia. The semantic data 216(1) may identify one or more terms and associations for search results. The negative filter data may also include exclusionary information regarding special designations, definitions, identification, mark, term, symbol, text, sound image or other multimedia. The ratings data 216(3) may include descriptions, characteristics, rankings, terms of use, and so forth.

Interaction data 218 may be stored in the repository 310. The interaction data 218 describes one or more interactions of one or more users 104 involving one or more of social networks or group affiliations. These interactions may include, but are not limited to, inquiries, page views, purchases, shares, replies, messages, recommendations, blog entries, or a combination thereof associated with the one or more users. For example, the user 104(1) may be presented with a specific search term, click on a website in relation to the term, and proceed to view the website. The user 104(1) may then activate a command to share that website with user 104(2) who is related to the user 104(1), generating an interaction between users 104(1), 104(2), and the website in relation to the specific term. In one implementation, the interaction data 218 may comprise a message entered by one of the one or more users 104.

The lexicon data 216 may be adjusted based on a relationship marking or a relationship counter. The relationship detail may identify that the target user 104 is having at least a portion of the interaction with a subset of available users. Continuing the example, at least a portion of the comments posted by related users 104(2), 104(3), and 104(4) may be presented. The relationship counter may indicate a number of interactions, such as messages, associated with the consumer object from related users. The relationship counter may comprise a numeric representation of a value indicative of the strength of the relationship. Further, for a user, the relationship counter may be increased or decreased based on a trust criteria. In other implementations non-numeric representations may be used. In one example, the relationship interactions may be symbolized by colors or temperatures ranging from "hot to cold," and these may be used a filter with regard to the specific lexicon data. In some implementations, the lexicon data may be filtered based on interactions associated with particular users 104 or groups of users, and degree of separation.

In another implementation, the lexicon data 216 may be filtered to remove interactions which have aged beyond a pre-determined amount. For example, the relationship counter may be configured to count interactions which are less than two weeks old. As a result, older interactions may be omitted from the count.

Further turning to the contents of the memory 328, the search query module 346 may be facilitated to provide results of relevant webpages 106 or documents to a user. The search query module 346 may utilize data files from the repository, or alternatively retrieve data from the user application of the particular user 306 or related users. The lexicon data may provide various semantic tags 216 to identify the webpage documents. For example, lexicon data may location information for a user, tags indicating keywords, terms of arts, industry specific jargon, tags identifying visual information and audio information. Are examples of user-defined lexicon data 216 that may be utilized to identify and return queries based on user-specific lexicon. The lexicon data may be stored in advance in the query request.

Further referring to the search query module 346, it may receive a list of search parameters or query parameters input by a user seeking documents. These search or query parameters may include, but is not limited to keywords, restrictions, negative identifiers or limitations, ratings etc. The search priorities may prioritize the results based on different parameters in the order of preference by the user for example.

In one illustrative example, if a user has a negative filter set for particular types of emotions or words, the negative filter may restrict all or a portion of the documents with tags that are identified by these filters.

The search query module 346 may provide contextual matching of the search parameters with the lexicon data and identify a list of webpage documents that satisfy these search parameters on the lexicon data. These identified web page documents may be transmitted or outputted for display to the user device. The search query module 228 may output to display the web pages satisfying search or query parameters inputted by the user, the presentation may further identify a rating, an expert, additional tags, emotions or negative emotions.

Further turning to the contents of the memory, in some examples, the account management module 334 may be configured to maintain, or otherwise store, account information associated with one or more requested accounts. The account information may include account holder information, a user ID, a password, acceptable answers to challenge questions, etc. In this regard, users 102 may be authenticated when accessing and/or utilizing the website.

Additionally, during operation, the user application module 332 may collect and/or track information associated with various user events and/or actions (e.g., clicks, reviews, ratings, etc.) associated with items. In certain embodiments, the collected information may be stored in memory 328 and/or any number of suitable databases for subsequent evaluation by the service provider computers 110.

Figure 4:
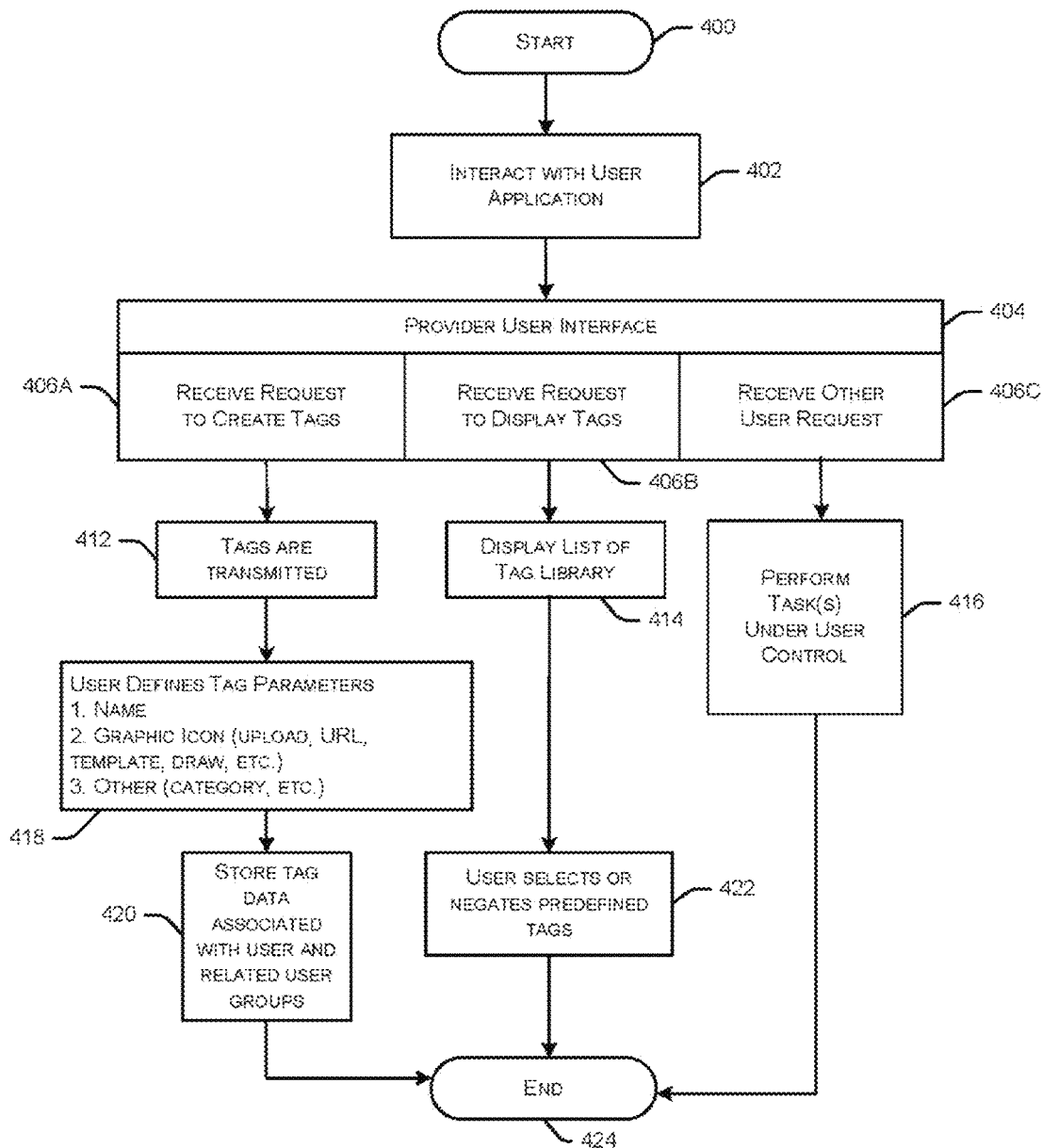
FIG. 4 is a representative method flowchart featuring the steps of creating sponsored tags.

FIG. 4 is a representative method flowchart featuring the steps of creating user defined tags for a lexicon.

In operation 402, a user may utilize the user application 306 and the associated GUI with the user application to provide an interaction to create user-defined lexicons or user-specific tagging.

In operation 404, a user be provided with a user interface to create tags. For example, a keyboard bar or a search bar may extend from the user application.

In alternative embodiments, the user can request to create tags (operation 406A), or request to display predefined tags (406B), or request other tasks 406(C).

If in operation 406, the user opts to create a user-defined customized tag, a GUI associated with the user application 306 enables the user to create customized tags in operation 412.

In operation 418, the user may further by defining the tag parameters 118, e.g. a name, a graphic icon, a category, etc. Once the customized tags are defined, the tag data can be stored and associated with the creator (user), user groups or everyone for future use based on verification and ranking.

If however, in operation 406, the user instead chooses to display the list of tag library, then in operation 414, the tag library may be imported from other lexicons. For example, if there is another user that is related to this user, or a common user group, common click patterns among other things. In operation 414, the user-application may render a GUI shows predefined tags for the user to browse.

In operation 422, the user can select tags among the predefined tags displayed 122, or opt to create customized tags 412 if he or she does not want to use the predefined tags. In addition to selecting a predefined tag a user can negate a predefined tag 422. For example many websites may utilize or generate tags that do not directly relate to the content provided on the website to increase their rankings and display in a convention heuristic based search engine. For example, a website may utilize hidden text with commonly searched keywords. For example, an independent politically active group who dislike a particular candidate "Rick," they may create websites about "donkeys" and utilize hidden text with the word "Rick." Therefore, in a search for the word, "Rick" a website for "donkeys" may appear. To combat this issue, a user may provide negative tags and these negative tags may be associated with a user group or with the general lexicon.

If the user has chosen to request other tasks 110 from the provider GUI 104, he can perform the tasks 416 and end the session 424.

Figure 5:
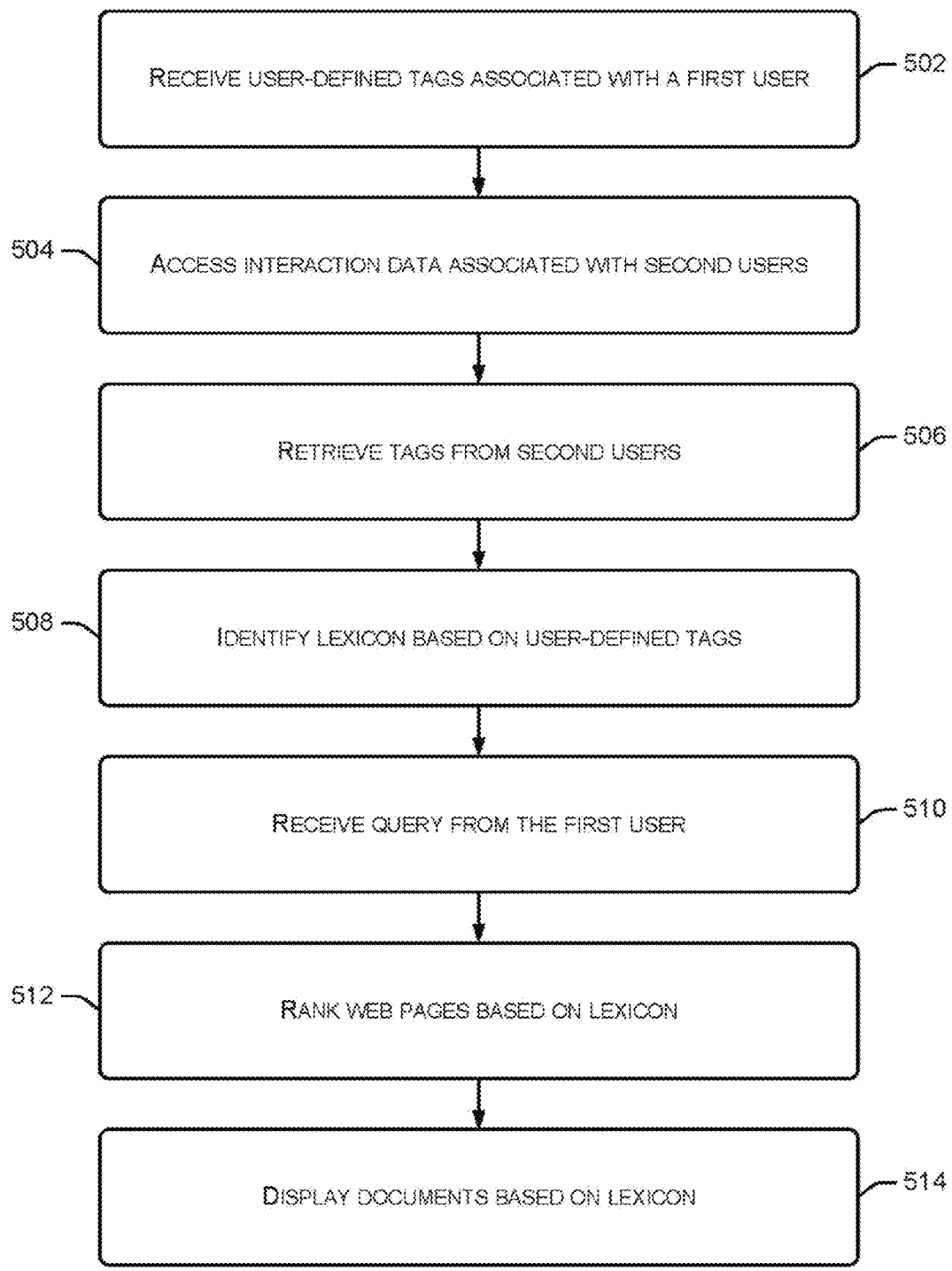
FIG. 5 is a representative method flowchart featuring the steps of creating embedded tags.

FIG. 5 is an example method for a user-based context dependent search engine. In block 502, the service provider system 110 may receive tags or other user-defined personalization for documents, content for the corpus. The content may include multimedia information, textual information, audio information, image information, video information, or the like, computer programs, scripts, games, logic, or the like. The tags may identify a specific context associated with the documents or webpages. For example, the tags may identify specific keywords, location-based information, links to other documents, data files etc.

In block 504, interaction data associated with the user may be identified. One or more links between the one or more tags and tag associated information (TAI) is generated. A link can include one or more relationships between a user-specific tag and TAI. In some embodiment, a interaction data may include or be represented by one or more static relationships. In further embodiments, the one or more links identifying relationships between the one or more tags and the tag associated information may have dynamic relationships. For example, if a tag is associated within a user-group, the tag may be less relevant to people outside the user group, therefore, the relationship to the document with the tag may be diminished.

In block 358, a lexicon may be generated based on the tags. For example, the lexicon may be generated to associate a portion of the interaction data, with keyword terminology and tags. Further, certain images and emotions may also be identified and used.

The lexicon may be encoded for access and transmission. The encoding may be in XML or other mark-up languages to identify certain user-specific tags, lexicon, user-groups, images etc. For example, the lexicon data may include a video data in relations to certain documents for increased relevancy to the user.

In block 510, the search engine server may receive a query from a user for information using certain keywords. The query may be either for a topic, an image, a recommendation on a restaurant etc. The user may also send optional preferences and parameters in the query.

In block 512, the documents may be ranked based on the lexicon for the user and the user-related preferences. The highest ranking webpages may be selected is selected, as this maybe the webpage documents that would be most suitable for the user's query.

At operation 514, the highest ranking websites is presented to the user. It may be presented either on the user device. The total number of websites presented to the user may vary based on the size of the users' browser screen and preferences.

Figure 6:
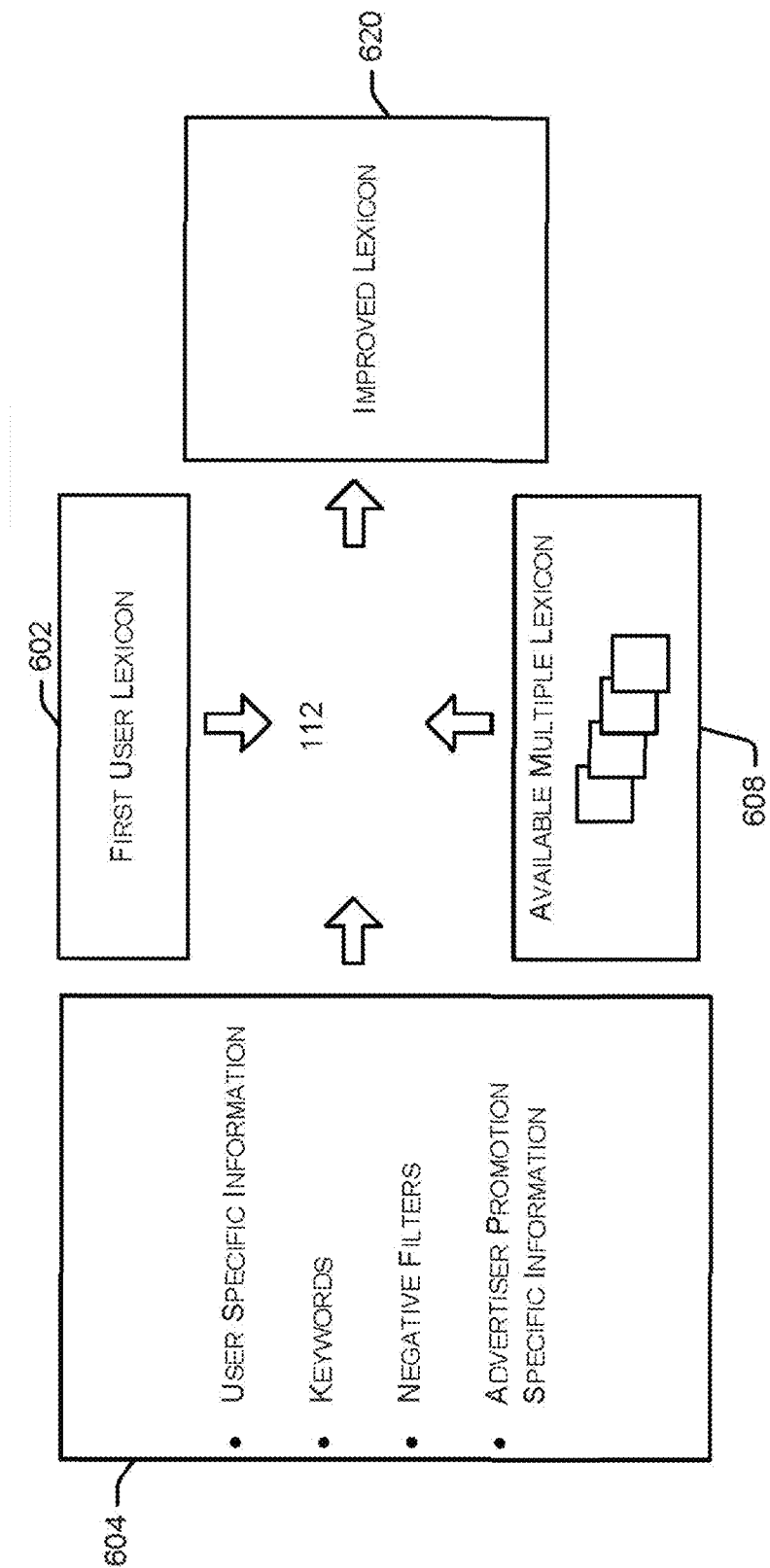
FIG. 6 is a representative graphic user interface (GUI) that allows a registered user to log in or a new user to register in the social networking website.

FIG. 6 illustrates a block diagram of an example data flow 600 for generating a lexicon, in accordance with embodiments of the disclosure. With reference to FIG. 6 a first user's lexicon content 602 may be identified for inclusion in a particular document or subject. For example, lexicon may be identified the service provider system 110 as illustrated in FIG. 3. As another example, lexicon's content may be identified by an input transmitted by a user device 104.

Additionally, a wide variety of information 604 may be identified and evaluated in order to determine additional lexicon to be incorporated in reference to a documents or a group of documents. Examples of information that may be evaluated include, but are not limited to, user specific information (user profile data, user emotion, user ratings, user-preferences, etc.). If it involves a product, service, or other item information (e.g., pricing information associated with an item, rating information, review information, item variation information, etc.), associated content specific information (e.g., content presented via a website, complementary product information, etc.).

Based upon an evaluation of at least a portion of the information 604, available multiple related lexicons 608 may be determined, selected, and/or generated for incorporation into context specific lexicons for either the document or for the users. The multiple user lexicons 608 may then be combined with the first lexicon 602 in order to generate a thorough lexicon. In other examples, if a user may decide to use a negative filter on a particular user group or content provided by certain user groups. For example, if someone was searching for "recipes" and the person were vegetarian, she might have negative filters from recipes from the American Beef Association etc. Therefore, when she searches for recipe, the lexicon is specifically subtracted from search terms.

Improved lexicon 620 with both filters and additions may be created. This lexicon may be user-specific, subject-specific, document, specific or document group specific.

As desired in various embodiments, a wide variety of variations may be made to the data flow 400 illustrated in FIG. 6. For example, other criteria and/or information may be evaluated out of order or combined with other methods The data flow 600 illustrated in FIG. 6 is provided by way of example only.

Illustrative Processes

Figure 7:
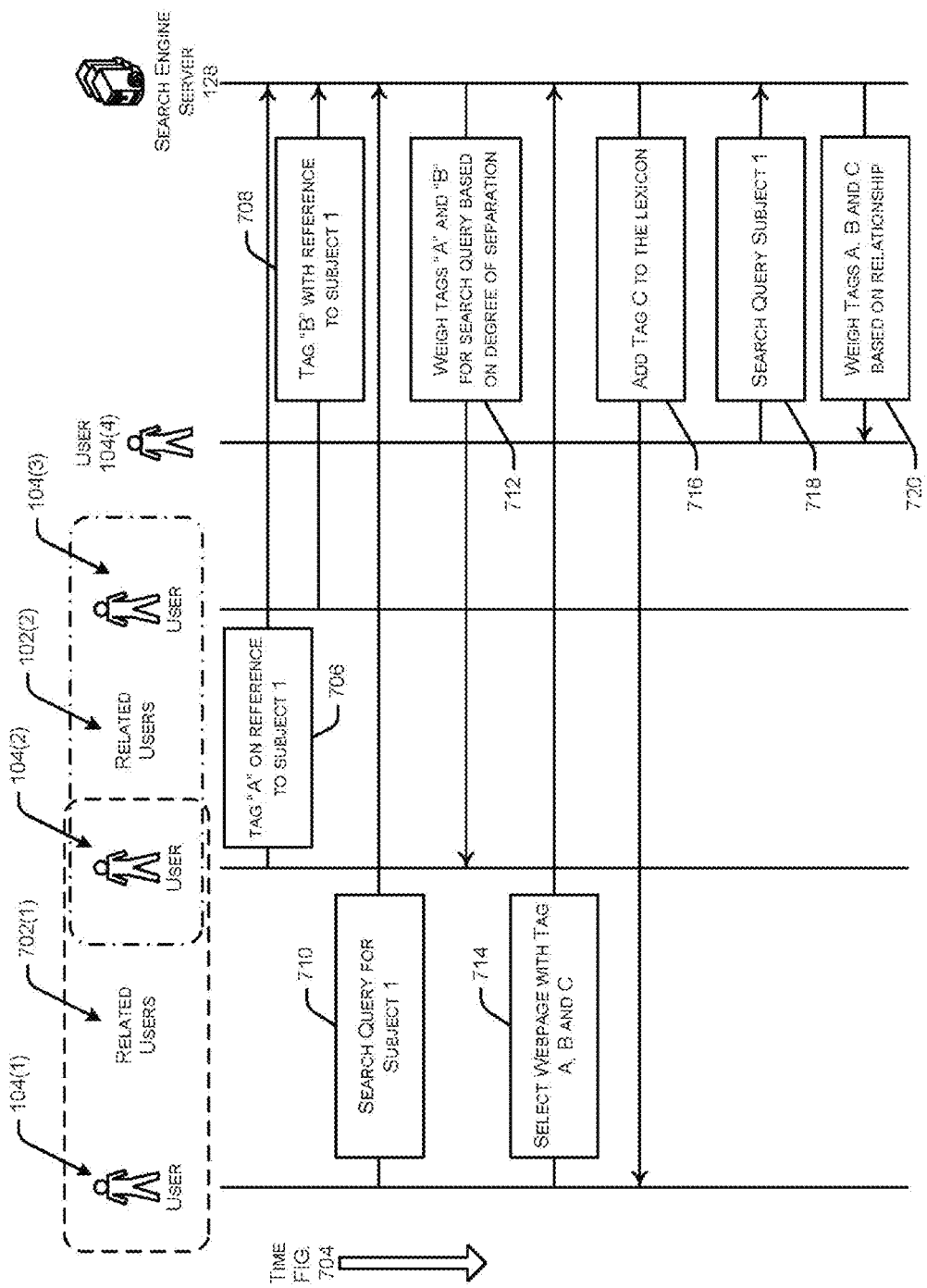
FIG. 7 is a representative GUI after a registered user has logged in to provide a starting point to utilize the social networking website's featured functions.

FIG. 7 illustrates a communication flow diagram 700 of several interactions between users 104 and the service provider system 110. By way of illustration, and not by way of limitation, four users are depicted 104(1)-104(4) having associated user devices 104 (not shown) as well as the search engine server 128. The communications may be transported by the network 108. In this illustration, the relationship module 350 has determined that users 104(1) and 104(2) are related to one another. The relationship module 350 has also determined that user 104(2) is also related to 104(3). User 104(4) is unrelated to users 104(1)-104(3). In this diagram, time increases along the direction of arrow 704.

At operation 706, a user 104(2) "Alice" communicates with the service provider system 110 to provide a tag "A" on a subject 1. For example, Alice may be commenting on the subject 1 utilizing tag A. This comment may be addressed to a particular group of users 104, or may be available to all.

At operation 708, a user 104(3) "Bob" communicates with the search engine server 128 to provide tag "B" about the subject 1. Continuing the example, Bob 104(3) may be identifying an image with relation to the subject 1. As above, this comment may be addressed to a particular group of users 104, or may be available to all.

At 710, a user 104(1) "Carol" requests information about subject 1 from the search engine server 128, or from another server in communication with the service provider system 110 or the user.

At operation 712, at least partly in response to the request, the service provider system 110 provides weighs tags A and B in relation to the degrees of separation. For example, Alice is directly connected to Carol. However, Bob is separated from Carol by two degrees. In this example, the search engine may weigh Alice's tags more heavily than Bob's tags because of the degree of separation.

At operation 714, the user 104(2) may provide to the search engine server 110 an additional comment "C" on the consumer object. For example, the user 104(2) may view a personal tag from another user and add personal experience with regard to the tag.

At operation 716, the service provider system 110 provides interaction data comprising the additional comment "C" to the users 104(1) and 104(3). This may be in response to a request by the users 104(1) and 104(3), or may have been pushed or sent without query to the user devices 102 associated with the users 104(1) and 104(3). The user 104(2) does not see a social marker 124 associated with this comment because it originated with user 104(2).

At 718, an unrelated user "Esha" may request information about the subject 1 from the service provider system or another server. Because the user is unrelated, the comments and interaction data may not be as relevant as it is for Alice, Bob and Carol.

At 720, the service provider system 110 may weigh the tags for A, B, C for the user Esha 104(4). Because the Esha user 104(4) is unrelated to user Alice, Bob or Carol, the lexicon may be filtered or otherwise weighted to account for the non-relationships of these entities. The lexicon or other interaction data 218 associated with the query may be available to the unrelated user "Esha" 104(4). For example, the user "Esha" 104(4) may view detail information about the topic of subject 1 which may include the comments "A,"

"B," and "C," recommendations from the users, and so forth. However, because no relationship exists between users 104(1)-104(3) and the user 104(4), the search results may be significantly different for "Esha" 104(4).

Figure 8:
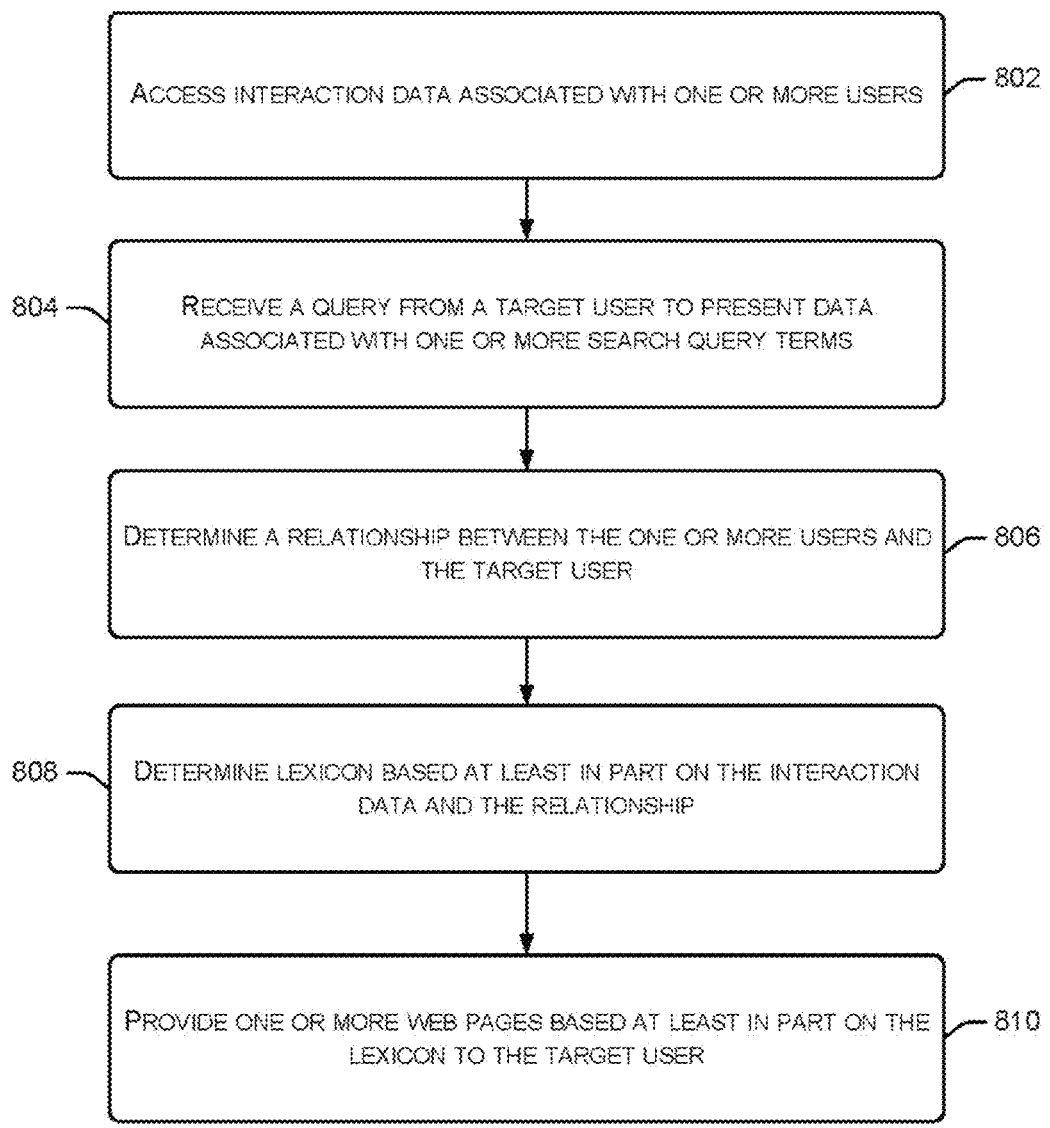
FIG. 8 is a representative GUI of a registered user's profile page, which enables the user to work with tags, invite friends, create teams, and other social networking tasks.

FIG. 8 illustrates a flow diagram 600 of a process of generating a lexicon based on interaction data. The process may be performed at least in part by the user device 104, the service provider system 110, another device, or a combination thereof.

At operation block 802 accesses interaction data 218 associated with one or more users devices 104(U). As described above, this interaction data 218 may comprise inquiries, page views, purchases, shares, replies, messages, recommendations, blog entries, or a combination thereof associated with the one or more topics which may be that the user device 104(11) has previously commented on a particular topic, website or document.

At operation block 804 receives a query from a target user device 104(1) to wherein the query contains terms associated with the interaction data 218. The terms may be terms or art or specific terms related to a topic or a subject raised during an interaction between users.

At operation block 806 determines a relationship between the one or more users 104(U) and the target user device 104(1). As described above the lexicon generation module 352 may retrieve relationship information from the user data 214 or generated by the relationship module 350. Continuing the example, the target user 104(1) may be determined to be friends with the user 104(11). The target user 104(1) may be identified by receiving login credentials, inspecting a cookie associated with an Internet browser, from biometric data, and so forth.

At operation 808 determines lexicon data based at least in part on the interaction data 218 and the relationship. As described above with respect to the lexicon generation module 352 in this example, this determination may utilize the comment made by the user devices 04(11), the target user's device 104(1) query, and the relationship between users 104(1) and 104(11).

At block 810 provides lexicons based at least in part on the interaction and relationship analysis to the target user 104(1). For example, the search engine server 128 may send to the user device 102 the lexicon which the user device 102 may then identify as the user's specific lexicon during a search query.

Figure 9:
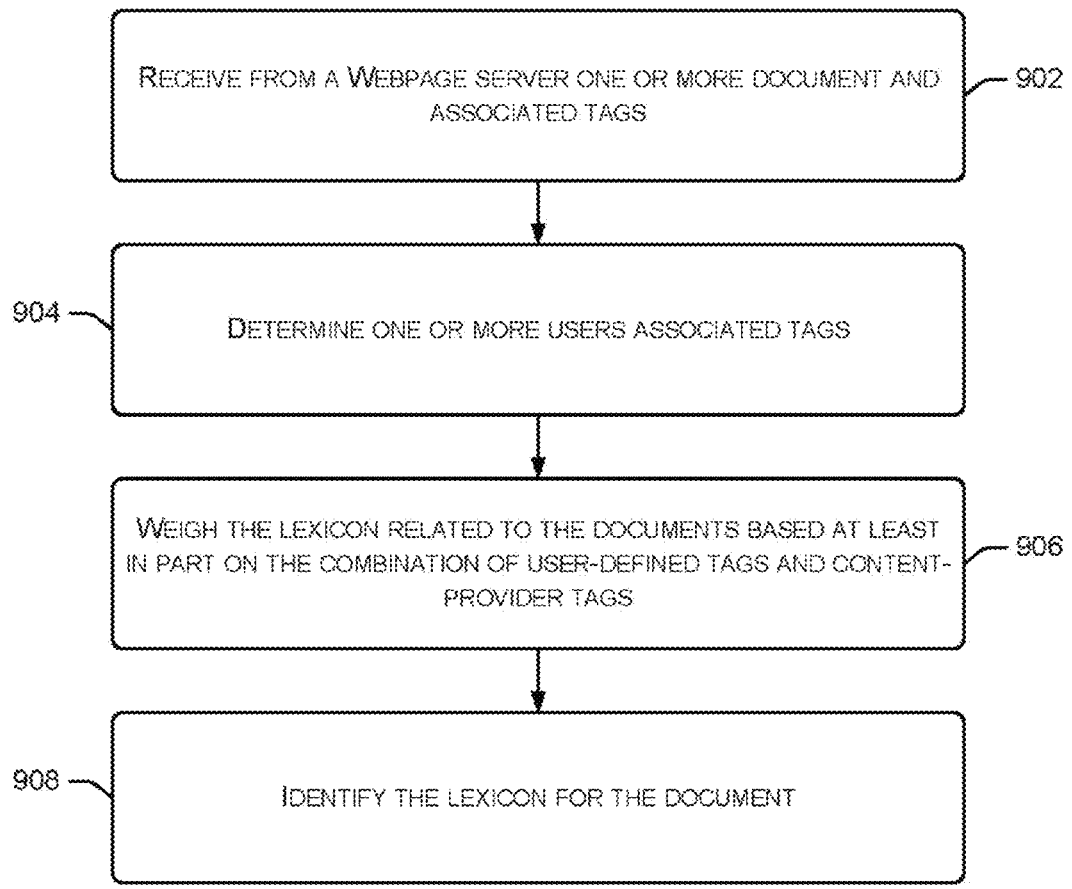
FIG. 9 is a representative GUI of another registered user's page where a user can invite to his team and send or request tags.

FIG. 9 illustrates a flow diagram 700 of a tagging or identifying the website content.

Block 902 receives from a website documents associated with the website. The entity may comprise an individual, a company, a group of companies, a marketing cooperative, and so forth. The documents may include, but is not limited to, text, sound, graphic, video, or a combination thereof. For example, the documents may be text and a link associated with other relevant documents. The documents may be transmitted with content provider tags that may identify the context and describe various instances of human-related semantic knowledge of the documents.

Block 904 determines one or more user-tags associated with the documents. In some implementations, this determination may be based at least in part on the interaction data 218. In other examples, the users may provide or identify the documents with certain context or semantic meanings or lexicon.

Block 906 generates lexicon that may be weighted based on the content-provider tags and the user-provided tags. For example, if many users across many community groups, with various interaction data provide certain tags, these tags may be receive a significant weight in comparison to the tags received by the content provider. For example, content providers may utilize certain tags to ensure that their websites are produced as the top listing for many web queries. Therefore, in order to maintain the integrity of the search results, the user-provided tags may be given greater weight if there is a significant different.

However, in other examples, if the user-provided tags is in agreement with the content provider tags, there may be a different weighing criteria in determining if these tags are relevant to the lexicon for the documents.

Block 908 associates the lexicon to the documents. Therefore, upon a query, the lexicon associated with the document may be utilized for identifying a relevance to a query.

Figure 10:
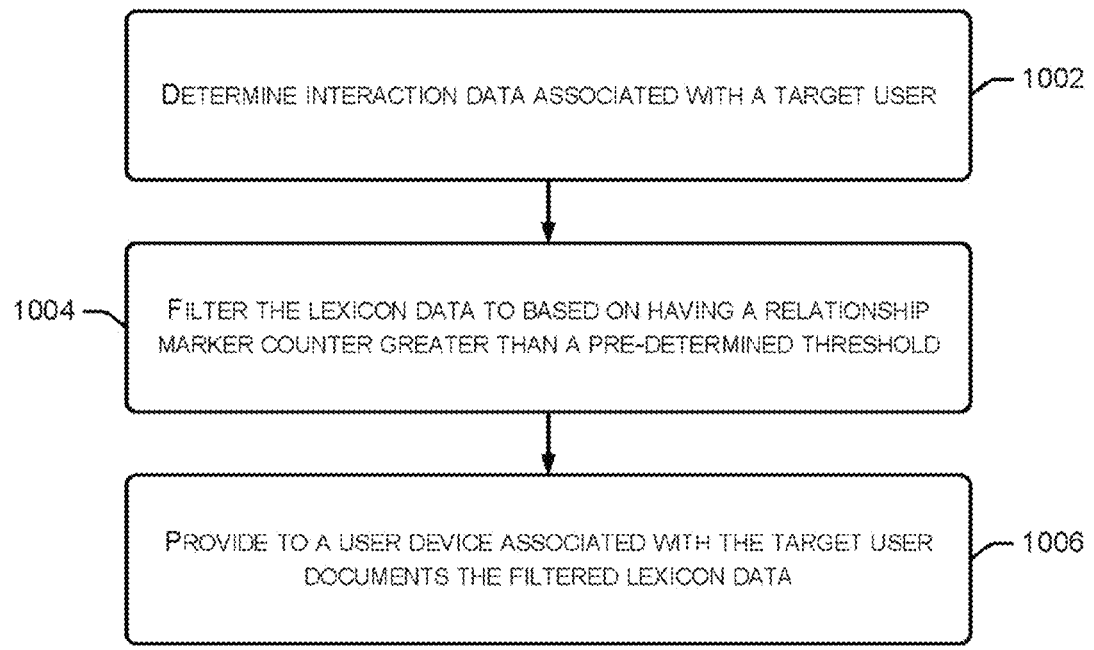
FIG. 10 is a sequence of steps showing how lexicon data is filtered for relationship markers that exceed a threshold.

FIG. 10 illustrates a flow diagram 1000 of a process of providing a search engine query. The process may be performed at least in part by the user device 105, the service provider system another device, or a combination thereof.

In block 1002, the service provider system 110 may determine the interaction data based at least in part on the relationship with the target user and one or more other users. The relationship may be based on degrees of separation in a social network. The relationship may be further based on location, or interaction.

Block 1004 filters the lexicon to select data or tags having a relationship counter greater than a pre-determined threshold. As described above, the relationship counter indicates a number of interactions, such as messages, associated with the website, a lexicon associated with a group of website documents, products services etc., from related users. In some implementations, each interaction may increment the counter.

In another implementation, the lexicon data may be filtered by one or more attributes. For example, instead of, or in addition to the relationship counter and pre-determined threshold, the lexicon may be filtered for a particular user 104 based on certain preferences such as by date, by content, and so forth.

The pre-determined threshold may be statically or dynamically set. The threshold may be set by a system administrator and applicable to one user 104 or a group of users 104. In another implementation, individual users 104 may set their threshold value. The threshold may be dynamically set, such as by comparing when the user selects the relationship the counter value. For example, some users 104 may typically disregard interactions until they have three or more interactions. Thus, for those users 104, the system may dynamically adjust so that relationship counters are presented when there are at least three interactions.

In block 1006, the filtered data may be provided to the user device.

Figure 11:
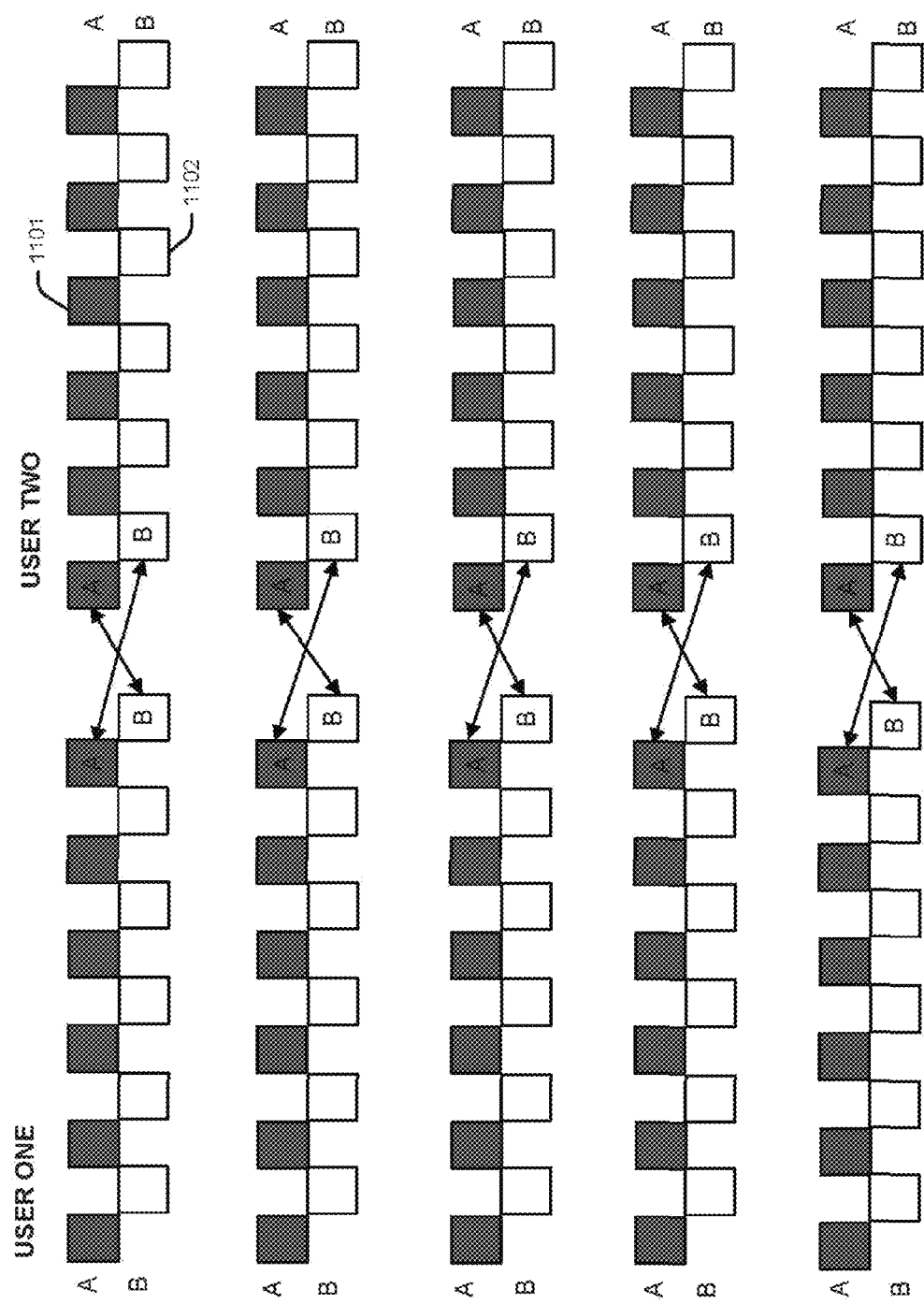
FIG. 11 is an illustration of how one stream in a two-part torrent stream updates the second stream.

FIG. 11 shows streams A and B for two users, user 1 and user 2. As shown, stream A (reference numeral 1101) for user 2 updates stream B for user 1, including updates to tags, and similarly, stream A for user 1 updates stream B for user 2 (reference numeral 1102).

Figure 12:
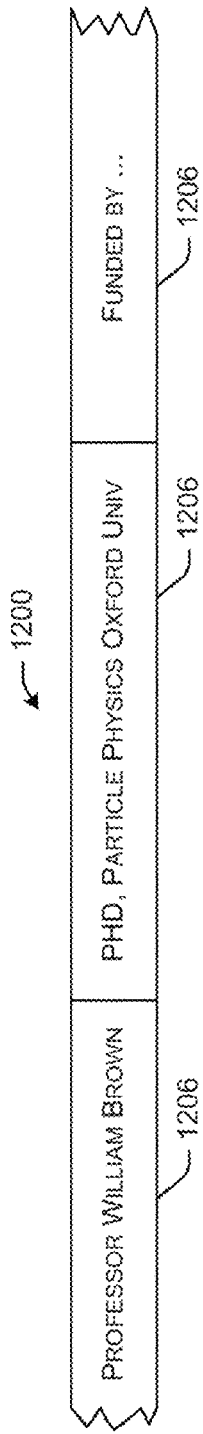
FIG. 12 is an illustration of tags placed in a string.

Directing attention to FIG. 12, tags 1202-1206 can be joined in string 1200 to help the search ie "Professor William Brown," shown in tag 1202, "PHD Particle Physics Oxford University,"-Tag 1204, and "Funded By Cern," shown in tag 1206. So in the example shown in FIG. 12, on scientific papers accreditation and funding can be linked in the tags, this of course would work with a wide variety of applications, such as films or any other group enterprise. Strings of tags work well for individual users and simple applications also. In an embodiment, the tags in string 1200 are weighted based on the user's choice. In embodiments where tags 1202-1206 are weighted equally, the cumulative amount of positive or negative tags (1 through 3+) make the first result hopefully the most relevant. If not, the user can tweak the weight of the tags in the tag sting in advanced mode, or chose negative tags to further refine the result. Results are based initially on positive agreement of tags, with initial tags taken from websites' meta data. Users can simply agree with meta data, and upon agreement the meta data is converted into tags. Adding tags (or disagreeing with the tags) is encouraged by the ease of use of tool rose 1700 user interface 1700 (discussed below with reference to FIG. 17). When a user disagrees with a tag, that disagreement becomes a tag also. Each user, their devices, and each community have unique identifiers. Each tag has the user's ID attached and is dated, which enables the removal of already-seen results, or selection of already-seen results to aid the search. At set moments consistent with privacy needs of users, the unique identifiers can be removed if or when required.

Figure 13:
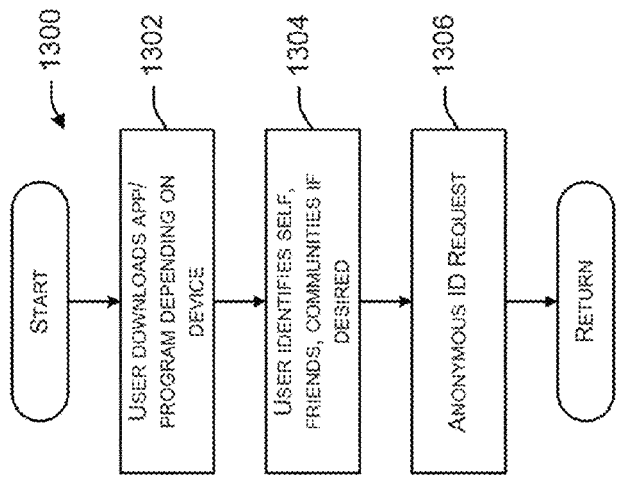
FIG. 13 is a sequence of steps executed on a user device to request an anonymous ID.

The present invention utilizes a torrent method that differs from a standard torrent in that at the moment each single torrent file is given its own unique identifier, each user is given unique identifier. However, in an embodiment, one can still maintain anonymity by requesting an anonymous ID. Each user has his or her own unique user identifier (referred to herein as a "UI") and a password for authorization. A further elaboration of the UI can be used for the user's devices. For example if their UI is "ABCD," their device(s) can be identified as ABCDA or ABCDB etc. Directing attention to FIG. 13, there is shown generally a sequence of steps 1300 that show interaction with a user device from the user perspective. At step 1302, the user downloads the app or program depending on their device(s). At step 1304, the user identifies himself, his friends and communities if desired. The user receives a identifier and pass-code for himself from service provider system 110, and from communities they are linked to, going through whatever security protocol the communities have instituted. Users also reciprocate with an asked friend and can be acknowledged by their friends, and have the facility to remove the friend's ID from their stream. At step 1306, if the user wishes to tag anonymously, he or she can request from service provider system 110 an anonymous tagging identifier, and a pseudo-randomly generated, encrypted key is then generated for that user. Service provider system 110 has the ability to delete tags from the network, keeping it safe, and still allows anonymity.

Each privacy or tag or community level has an add-on to that UI identifier which is also unique, enabling sharing by choice, degree of separation, community etc. For example, consider that user 0 has the UI of user0, and each device, if logged on and linked, would be user01 or user02 etc. At each tag level, privacy level, community, etc., there is a further refinement on the UI, so the most private level in which the user0 shares information between devices is for example user0a, the next level of sharing is user0b, etc. It is anticipated that a strong level of cryptography is provided for the most private levels. Every standard file seeded has a UI that is linked to the user and to the privacy level chosen. Each time users log on, the can choose their own ID, or use an anonymous ID (double blind key). There also is no need to log in to search standard tags, but the login is needed to search private tags, by degree of separation, private communities and the like. Thus, using the torrent system of the present invention as described herein, each community creates its own alternate Internet as a heterogeneous network solution.

The service provider system 110 has its own node computers that operate on private streams so that user updates don't choke the base registry with direct information. With open tagging as described herein, each user is tied in by their initial registration to a specific base node computer, nd the computers of the service provider system 110 update each other at set times. Each set user group, private community or the like also can choose select devices such as any Internet-enabled device, computers, tablets, mobiles, watches, televisions, etc. to act as main nodes when needed by a level of users to avoid choking the system.

Figure 14:
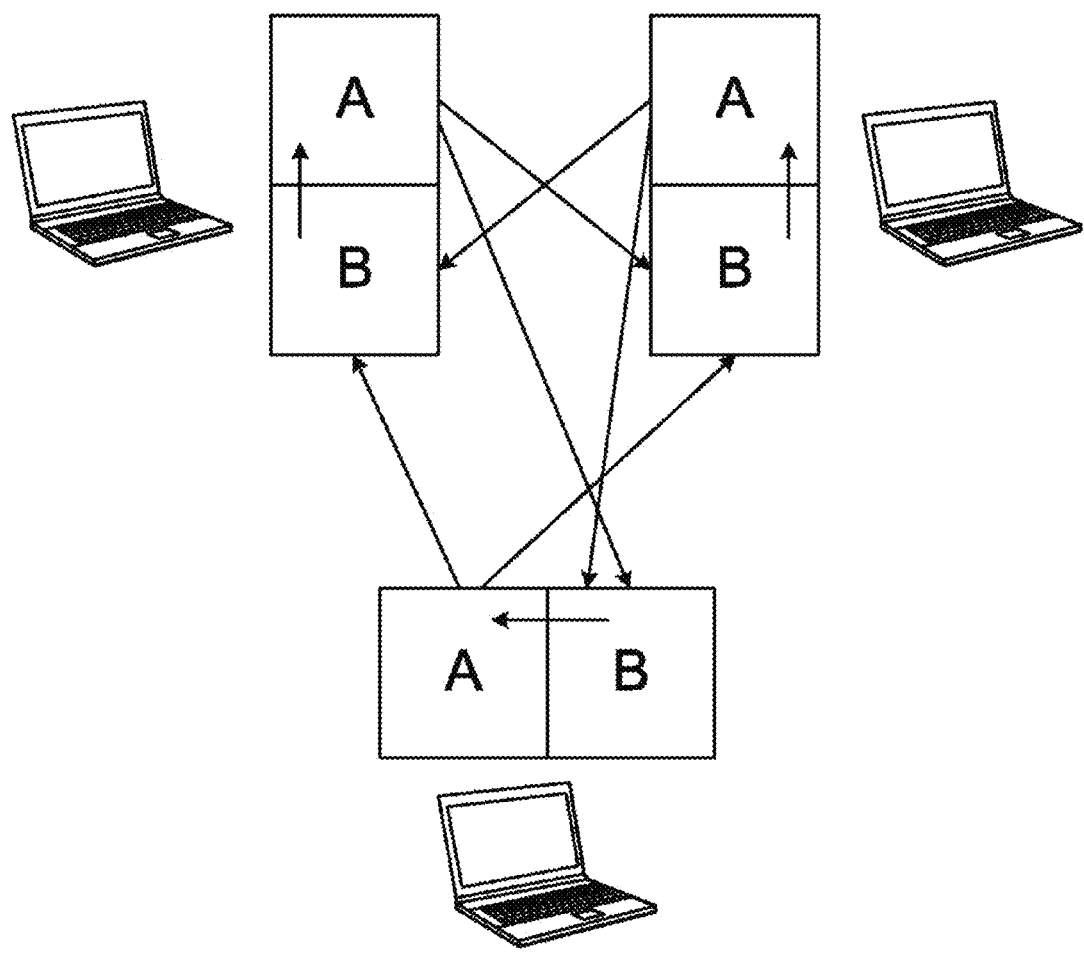
FIG. 14 is an illustration of streams A and B forming an updatable torrent stream.

Directing attention to FIG. 14, each torrent file level consists of two variable data streams A and B. Stream A is used as a base standard registry. Stream A is updated by the program from stream B at set moments of time as the data is accrued and changed. The data in stream A and B are time stamped, with this the program recognizes and updates from stream B to stream A. When the user tags the meta data, it is stored in stream B, which then updates stream A.

Each time A is updated it automatically saves the base registry file and seeds updates to stream B of the allied devices and computers within the privacy setting. B updates to A, which updates to other users' stream B and so on in a cyclical fashion. Streams A and B are in the same torrent structure, two halves of the same whole.

When there is a new tag, it is attached as meta data to a URL, or as meta data to a identifier of the base program file (for example, word processor files or image or sound files), that is then stored in the base registry, the meta data is time stamped, with this the tags are shared from stream B, to A at set moments and new tags are recognized to be shared to the privacy levels of the users choice. Tags are either user-identified, or base definitions, base definitions are set categories of standard URL meta data or user-based tags such as emotion etc as described herein. Stream A also updates streams and seeds to the node the user is identified with, again dependent on the privacy setting of the user.

Figure 15:
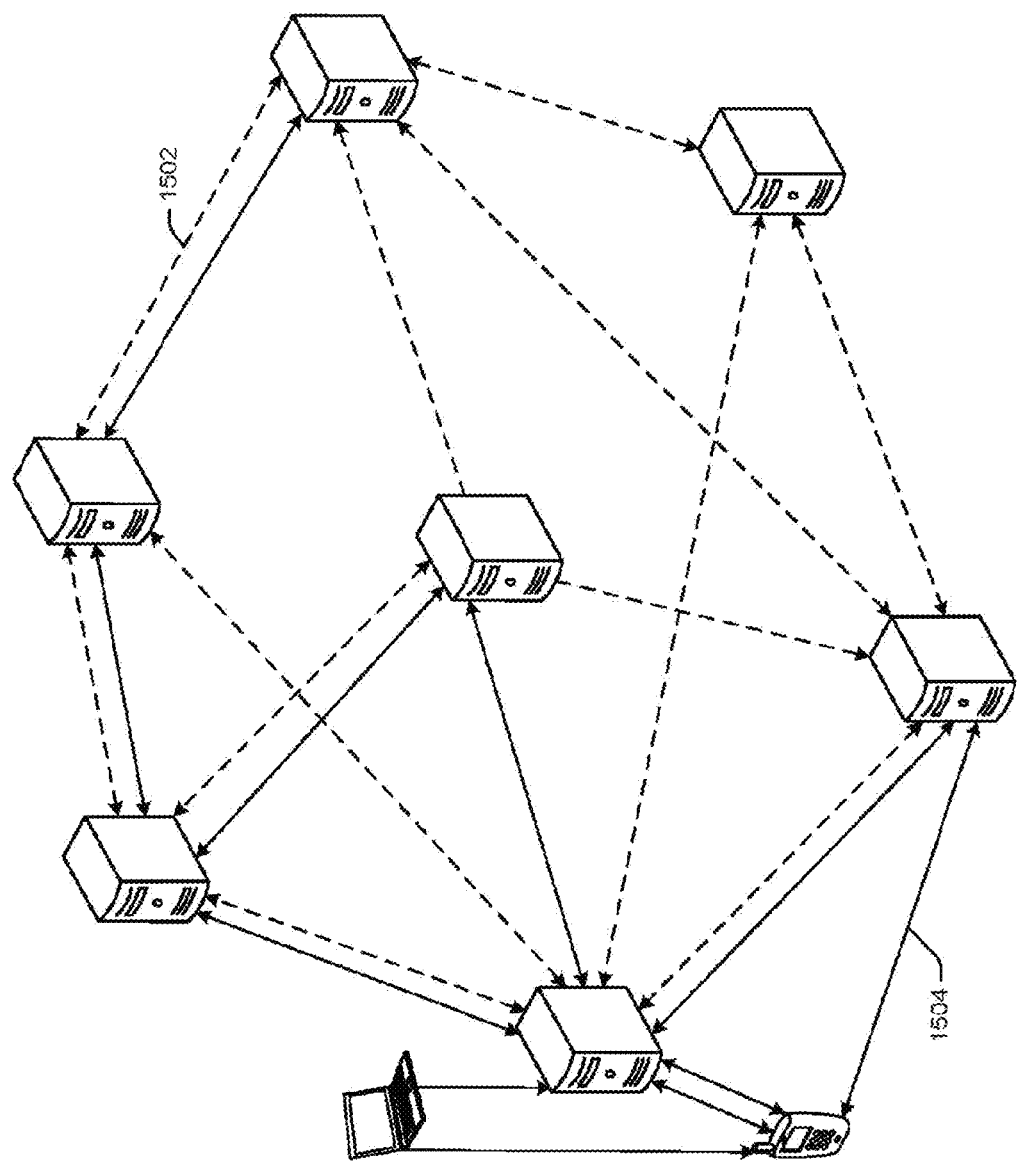
FIG. 15 is an illustration of open and closed torrent streams between a user's devices and other users communicating with the user over a computer network.

Directing attention to FIG. 15, each device acts as a server for every other device the user wishes to interact with, or other users, or communities, and as such maintains privacy. Each user and each community have unique identifiers enabling direct communication. As shown in FIG. 15, arrows having dashed lines such as arrow 1502 show the open torrent streams. The solid lines 1504 show closed torrent streams, either between a user having multiple devices backing up information and tags, or degrees of social separation or set communities. Again, as service provider system 110 is the main seeder, it stores copies of all open tags, and allied community tags, to enable general search.

Figure 16:
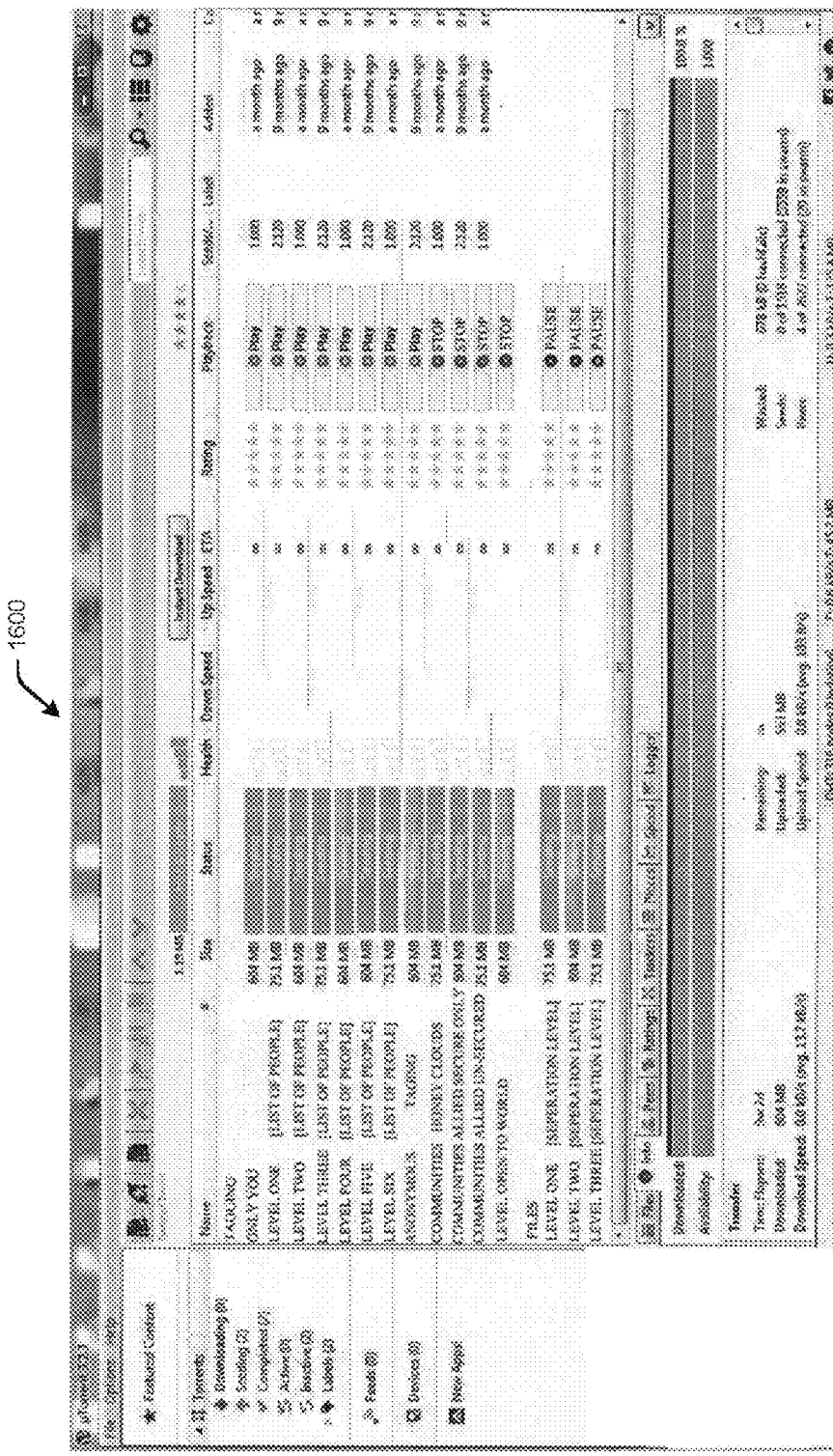
FIG. 16 is a representative GUI showing a plurality of torrents managed by a user.

Each torrent file contains identifiers to the tagging information level, community (or club etc.) share level, and a file share level, all of which may have various degrees of privacy. This is illustrated in FIG. 16, where multiple torrents are shown. This way, the information is placed in the appropriate torrent, and at each level the user can choose how to interact by sharing only what they want to.

The torrents file streams are updated continually, unlike a standard torrent. With this facility tool rose 1700 can forward messages from users who are linked, and as tool rose 1700 is linked to service provider system 110, it can also, given permission, forward standard messages, such as Facebook pm's, tweets, email etc. (see message button on tool rose 1700).

Meta data from websites act as initial standardized tags, users can agree with standard tags at a click (see tag history button on tool rose 1700). Users can choose to seed or leach whichever stream, so they don't necessarily store large amounts of data on their devices, and the standard pre-set is to just seed, as the search on the tool rose 1700 triggers a link to the main HC stores. The user is also given the option once a month to delete their open tags, and if they want to, at that time they can also release their identifier when releasing the tags.

As service provider system 110 is the main seeder, it stores copies of all open tags, and all allied community tags, to enable general search. Tags are seen in clusters, above or below certain percentages they have variable weight to the search, and people who tag continually against the norm are labeled as maverick, inappropriate (racist, pornographic, etc.) tagging will be removed regardless if the person is anonymous as their tags still have a code even though they cannot be identified.

Figure 17:
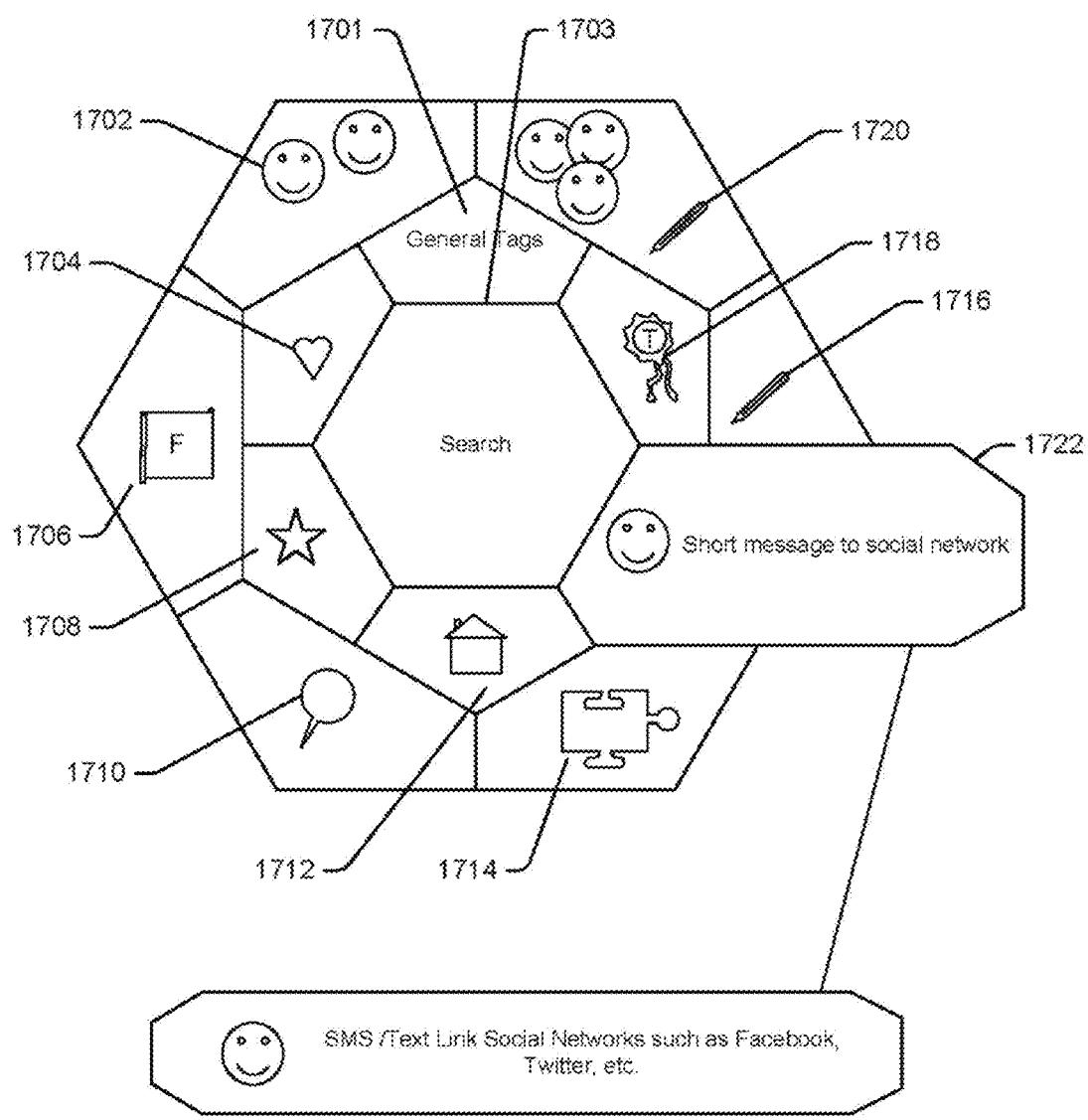
FIG. 17 is a representative GUI showing a tool rose application user interface used to tag contents of files and communication with other users.

Directing attention to FIG. 17, tool rose 1700 links and interfaces with various browsers to maintain tagging across different sites on the internet, and identifies various programs and files to enable cross-tagging for personal cross-referencing of file types. A segment of tool rose 1700 is available for advertising to unidentified non-subscribers. Tool rose 1700 presents a plurality of functional buttons to a user that allow enable a user to perform tagging in accordance with the present invention. A user can generate a tag by selecting generate tag button 1701. Friend finder button 1702 allows a user to find other individuals with similar interests or tags. Search function 1703 provides functionality for a user to search as described above. Emotional tag 1704 allows a user to tag content with a symbol conveying the user's emotional reaction to the tagged content. Save to file function 1706 allows a user to capture content to local or cloud storage. Rating function 1708 allows a user to tag content with a rating indicator. Messages function 1710 allows the user to draft messages that are inserted into tags. Login/Settings function 1712 allows a user to perform login functions and manage login settings for various websites. Quick links button 1714 presents a plurality of URLs convenient to whatever context or state the user is in, for example the context or state can change as a user moves from connection to one website to another website. Notes function 1716 allows the user to draft, edit, store, or read notes associated with user context or state. Trusted button 1718 allows a user to endorse through tagging a website by placing an indication that the site is trusted by the user. Public notes 1720 allows a user to publish notes through tagging to other users regarding a particular site. Tool rose 1700 can be clicked or touched to be opened on a user device, and can run in background mode and remain active continuously. Tool rose 1700 is especially useful for users belonging to social networks, as short message to social network button 1722 provides a broadcast function to a subset of individuals belonging to the social network who are in communication with each other.

Figure 18:
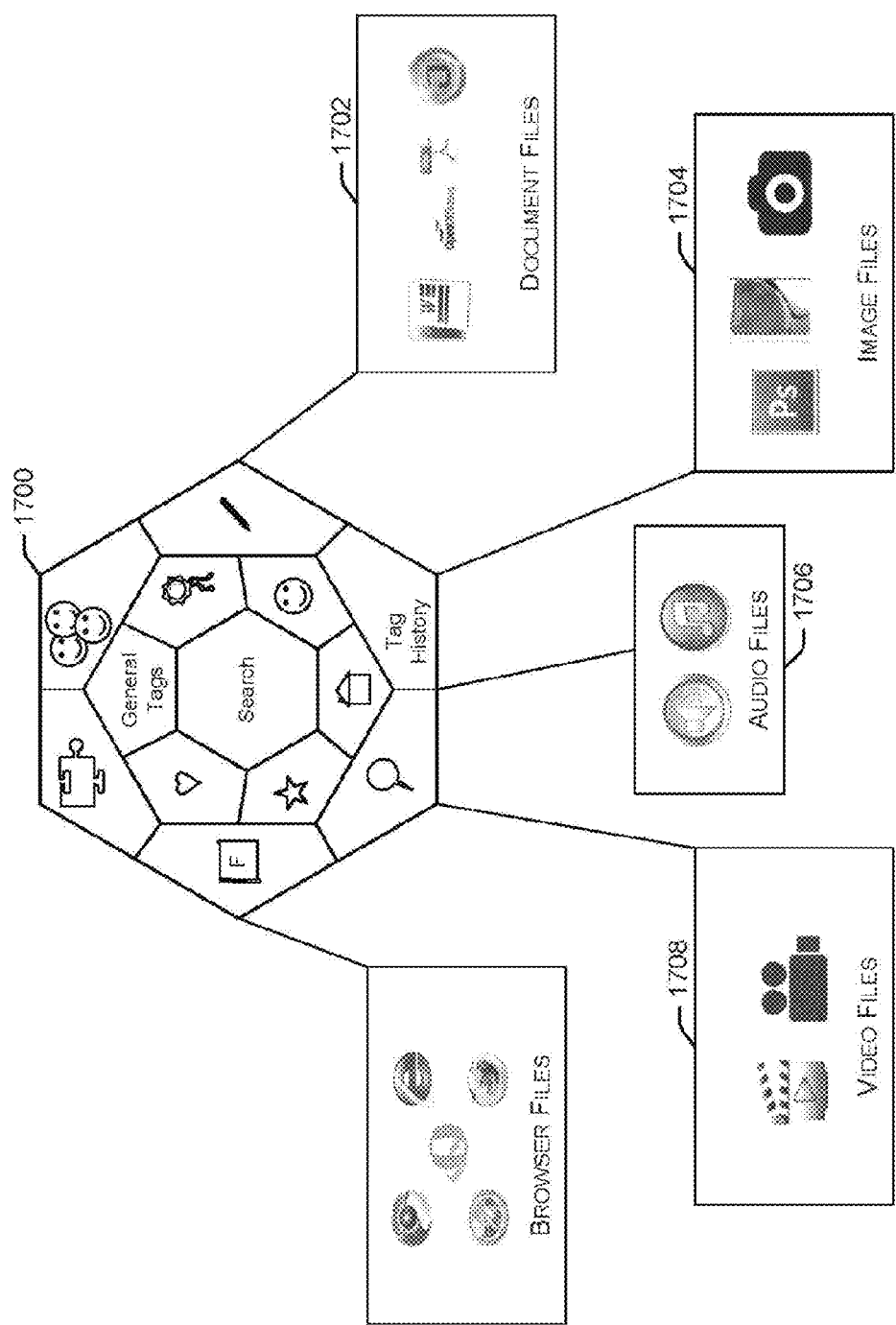
FIG. 18 is an illustration of a representative GUI showing the tool rose application user interface and various file types it operates upon.

Tool rose 1700 is useful with a wide variety of files. Directing attention to FIG. 18, tool rose 1700 can be used with word processing or document files 1702, image files 1704, audio files 1706, video files 1708, and browser files 1710, such as webpages.

Figure 19:
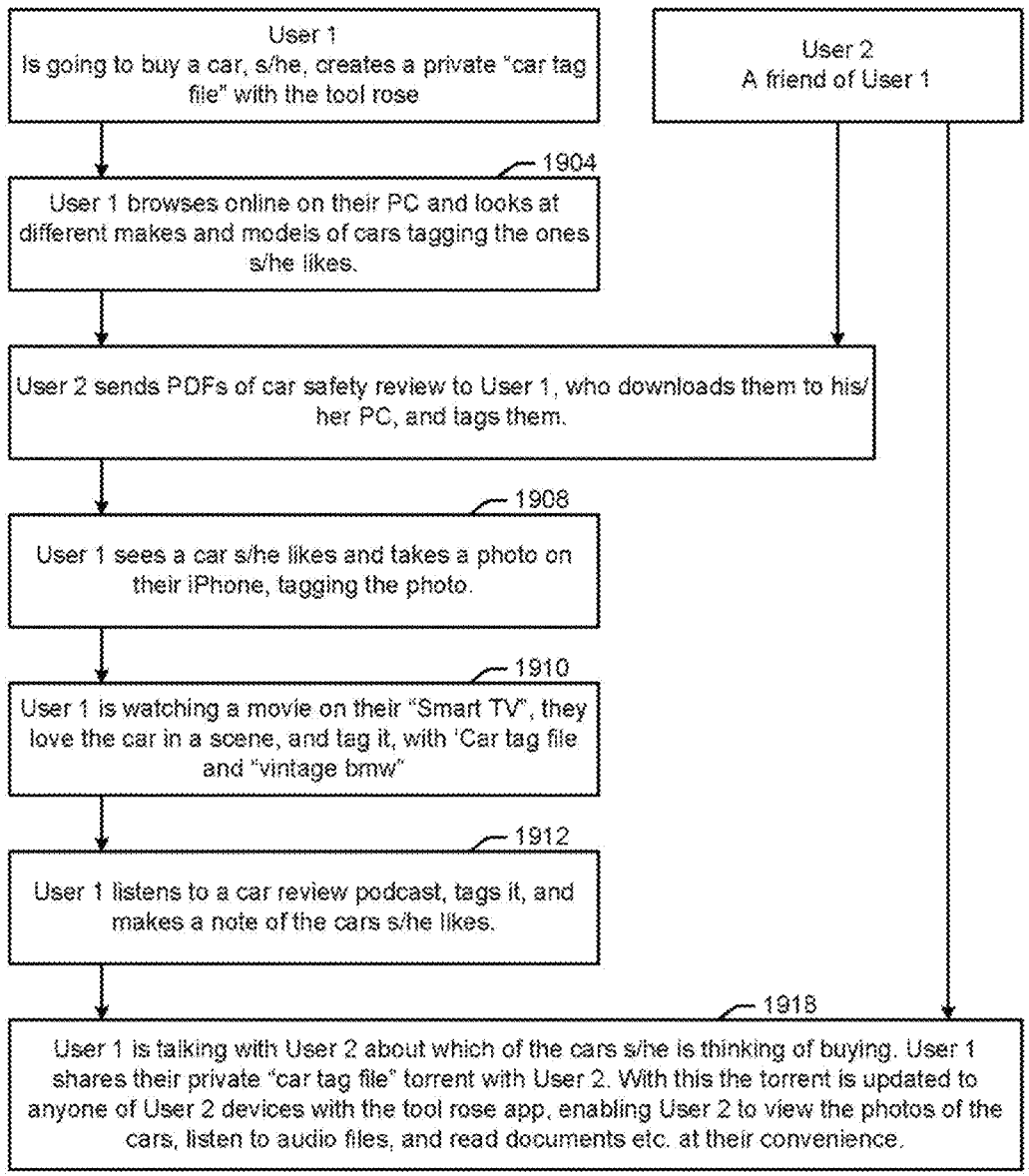
FIG. 19 is an exemplary sequence of steps showing the application of the tool rose application user interface as used between two users.

Use of tool rose 1700 is shown as a sequence of steps in an exemplary sequence of steps shown in FIG. 19. User 1 is going to buy a car, and creates a private car tag file with tool rose 1700 at step 1902. At step 1904, user 1 browses online and reviews different makes and models of cars, tagging the ones s/he likes. At step 1906, user 2 sends files of car safety reviews to user 1, who then downloads them and tags them using tool rose 1700. At step 1908, User 1 sees a car s/he likes, and takes a photograph of it using a digital camera, and tags the photograph file using tool rose 1700. At step 1910, user 1 is watching a movie on a smart tv, and when s/he sees a car, s/he tags it with tool rose 1700 and tags the movie with a car tag file and vintage BMW. At step 1912, user 1 listens to a car review podcast, tags it with tool rose 1700, and makes a note of the cars s/he likes. At act 1918, user 1 is talking with user 2 about which of the cars s/he is thinking of buying. User 1 shares their private car tag file torrent with user 2. With this sharing, the torrent is updated to any of user 2's devices with tool rose 1700, enabling user 2 to view the photographs of the cars, listen to audio files, read documents, etc., at their convenience.

Figure 20:
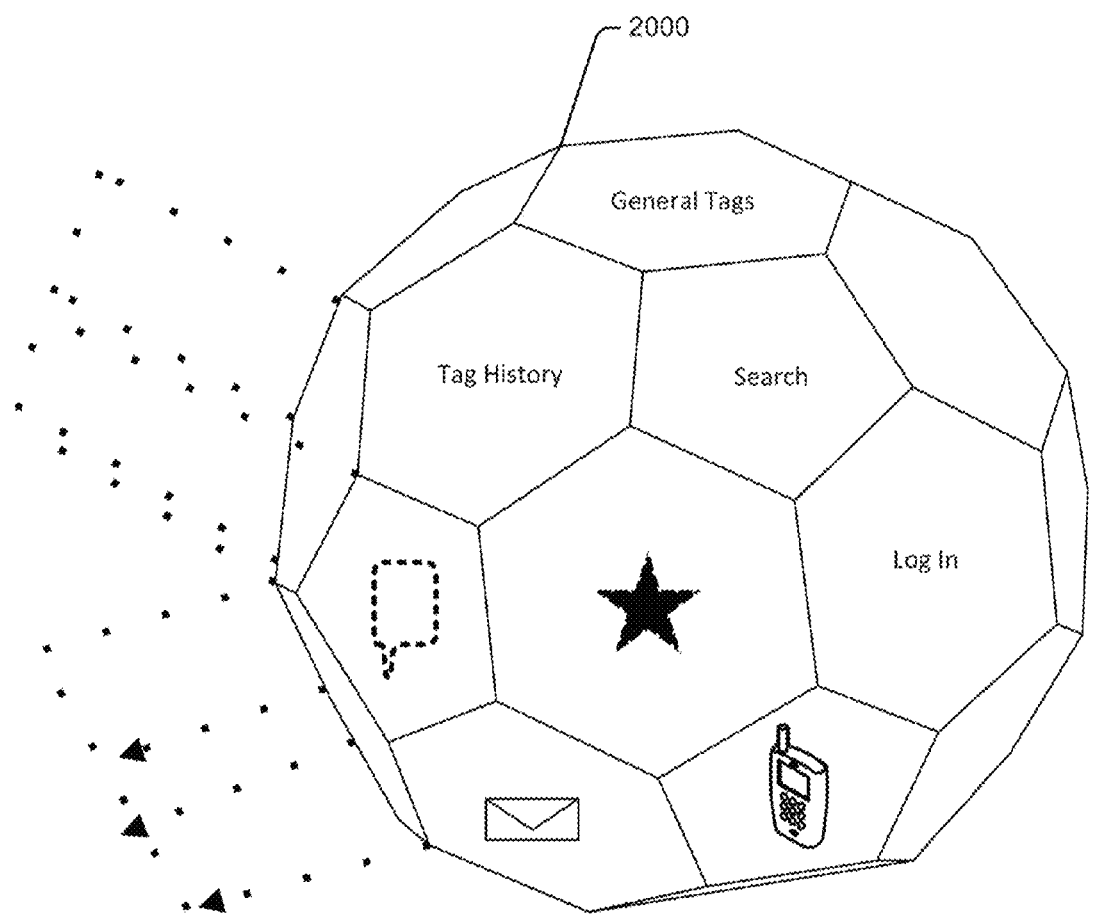
FIG. 20 is an illustration of a representative GUI showing a three-dimensional tool rose application user interface.

While tool rose 1700 is shown as a two-dimensional image, it can also be implemented as a three-dimensional image, as shown in FIG. 20. Tool rose 200, as shown, can be a spherical or other three-dimensional shape that displays one set of icons on one view, but allows the user to manipulate it through a touchscreen or other method to rotate the image in three-dimensional space, thus concealing the first-displayed set of icons and revealing another set of icons. This may be useful where some functions are used with certain files but not others. It also allows the user to focus on a simpler image, thus reducing eye fatigue on the user. Also, a portion of tool rose 1700 and tool rose 2000 can expand open to present a better view. Tool rose 1700 and tool rose 2000 can be a transparent image, showing only faint lines to show the user that it is present while obstructing a small area of a displayed file, until tool rose 1700, 2000 is selected by the user for tagging of the file.

While numerous embodiments have been described in detail and illustrated herein, it is to be understood that modifications can be made to these embodiments of the present invention without departing from the spirit thereof.

What is claimed is:

1. A system for operating an expert-informed information acquisition engine utilizing an adaptive torrent-based heterogeneous network solution, the system comprising:
   a memory storing computer-executable instructions;
   a processor configured to access the memory and execute the computer-executable instructions to:
   receive a two-part torrent stream, wherein a first part of the two-part torrent stream is a torrent stream containing one or more first documents and content-provider tags associated with the one or more first documents and a second part of the two-part torrent stream is a stream updating the first part of the two-part torrent stream;
   receive user-defined tags associated with a first user;
   identify one or more second users based on one or more of social networking connections between the first user and the one or more second users, similar browsing patterns between the first user and the one or more second users, similar tagging patterns between the first user and the one or more second users, and similar negative identifiers between the first user and the one or more second users;
   receive user-defined tags associated with the one or more second users;
   identify a lexicon based on the user-defined tags associated with the one or more second users and the user-defined tags associated with the first user, and further based on the content-provider tags;
   receive a query from the first user, the query including parameters input by the first user seeking documents;
   apply the query and receive one or more documents as results of the query;

rank the one or more documents based on the lexicon; and display one or more ranked documents based on the lexicon.

2. The system of claim 1, the one or more user-defined tags comprising association of one or more keywords to a document of the one or more documents.

3. The system of claim 1, wherein identifying a lexicon further comprises providing a negative filter removing one or more keywords and user-defined tags.

4. The system of claim 1, wherein the one or more documents are characterized by the absence of documents previously presented as results of a query.

5. The system of claim 1, wherein identifying the lexicon further comprises weighing the user-defined tags associated with the one or more second users based at least in part on a frequency of interaction between the one or more second users and the first user, wherein the lexicon is further based on receiving a trust criteria from the first user.

6. The system of claim 5, further comprising weighing the user-defined tags associated with the one or more second users based at least in part on the trust criteria from the first user.

7. A system for operating an expert-informed information acquisition engine utilizing an adaptive torrent-based heterogeneous network solution, the system comprising:

a memory storing computer-executable instructions;

a processor configured to access the memory and execute the computer-executable instructions to:

receive from a webpage server a data stream, the data stream being a two-part torrent stream, wherein a first part of the two-part torrent stream is a torrent stream containing one or more first documents and content-provider tags associated with the one or more first documents and a second part of the two-part torrent stream is a stream updating the first part of the two-part torrent stream;

receive, from one or more users user-provided tags associated with the one or more first documents, the one or more users user-provided tags provided by one or more second users, the one of more second users identified based on one or more of social networking connections between a first user and the one or more second users, similar browsing patterns between the first user and the one or more second users, similar tagging patterns between the first user and the one or more second users, and similar negative identifiers between the first user and the one or more second users;

associate user-provided tags with the one or more first documents, a weight of the user-provided tags based at least in part on one or more of social networking connections, similar browsing patterns, similar tagging patterns, and similar negative identifiers between the first user and the one or more second users; and provide results to the first user.

8. The system of claim 7, further comprising associating the content-provider tags and the user-provided tags with a plurality of related documents.

9. The system of claim 7, wherein providing results comprises providing results characterized by the absence of already-seen results.

10. The system of claim 9, further comprising storing a plurality of keywords in a datastore.

11. Computer-readable media storing computer-executable instructions that, when executed by a processor, configure the processor to implement a system for operating an expert-informed information acquisition engine utilizing an adaptive torrent-based heterogeneous network solution, by:

receiving a two-part torrent stream, wherein a first part of the two-part torrent stream is a torrent stream containing one or more first documents and content-provider tags associated with the one or more first documents and a second part of the two-part torrent stream is a stream updating the first part of the two-part torrent stream;

identifying one or more users based on one or more of social networking connections between a target user and the one or more users, similar browsing patterns between the target user and the one or more users, similar tagging patterns between the target user and the one or more users, and similar negative identifiers between the target user and the one or more users;

accessing interactions between the one or more users and one or more documents, the interactions including one or more of social networking connections, similar browsing patterns, similar tagging patterns, and similar negative identifiers between the one or more users;

determining lexicon data based at least in part on the interactions and the relationship with the target user, and further based on the content-provider tags; and returning results to the target user.

12. The computer-readable media of claim 11, the operations further comprising:

filtering the lexicon data to select lexicon data having a relationship counter greater than a pre-determined threshold; and providing to a user device associated with the target user one or more document based at least in part on the filtered lexicon data responsive to a search query.

13. The computer-readable media of claim 12, the operations further comprising: receiving a selection from a user device, wherein the selection comprises of one or more documents.

14. The computer-readable media of claim 13, the operations further comprising:

updating the filtering criteria for the lexicon based at least in part on the selection.

15. The computer-readable media of claim 12, wherein the results are characterized by the absence of results previously included as results of a query.

16. The computer-readable media of claim 11, the interactions comprising a message entered by one of the one or more users.

17. The computer-readable media of claim 11, the operations further comprising:

filtering the lexicon data by one or more attributes specified by the target user.

* * * * *